(12) United States Patent
Kawakatsu et al.

(10) Patent No.: US 7,641,558 B2
(45) Date of Patent: Jan. 5, 2010

(54) CONSTANT VELOCITY JOINT

(75) Inventors: Tsutomu Kawakatsu, Utsunomiya (JP);
Takahiro Ogura, Oyama (JP); Naoto Shibata, Utsunomiya (JP); Shouichi Nakao, Utsunomiya (JP); Tomonori Aoyama, Mooka (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 392 days.

(21) Appl. No.: 10/589,896

(22) PCT Filed: Mar. 1, 2005

(86) PCT No.: PCT/JP2005/003389

§ 371 (c)(1),
(2), (4) Date: Aug. 18, 2006

(87) PCT Pub. No.: WO2005/083283

PCT Pub. Date: Sep. 9, 2005

(65) Prior Publication Data

US 2007/0167243 A1   Jul. 19, 2007

(30) Foreign Application Priority Data

| Mar. 2, 2004 | (JP) | ............................. 2004-057137 |
| Jun. 30, 2004 | (JP) | ............................. 2004-192491 |
| Jun. 30, 2004 | (JP) | ............................. 2004-192501 |

(51) Int. Cl.
   *F16D 3/205* (2006.01)

(52) U.S. Cl. ...................... 464/111; 464/132

(58) Field of Classification Search ............... 464/111, 464/123, 124, 132, 905; 384/564
See application file for complete search history.

(56) References Cited

U.S. PATENT DOCUMENTS

| 3,008,311 A | * | 11/1961 | Mazziotti ................ 464/123 |
| 4,484,900 A | * | 11/1984 | Orain ...................... 464/111 |
| 5,591,085 A | | 1/1997 | Stall et al. |
| 5,989,124 A | | 11/1999 | Goto et al. |

(Continued)

FOREIGN PATENT DOCUMENTS

FR    2 812 916 A1    2/2002

(Continued)

OTHER PUBLICATIONS

Supplementary European Search Report, Application No. EP 05 71 9706, Date of Completion of the Search: Aug. 20, 2009, pp. 1-6.

*Primary Examiner*—Greg Binda
(74) *Attorney, Agent, or Firm*—Squire, Sanders & Dempsey, LLP

(57) ABSTRACT

An annular member is installed on a circular cylinder section of a trunnion, and a roller member, in the inner periphery of which a needle bearing is held, is installed on the circular cylinder section. The needle bearing is held between a flange section formed on one end of the roller member and the annular member installed on the trunnion with a predetermined gap between them. Further, a gap (X) between the needle bearing and the annular member is set to satisfy the following relationship. $X > R/2 \cdot (1/\cos \theta \max - 1)$ where R: Radius of rotation of the center of the roller member relative to the center axis of an outer member. $\theta$ max: Maximum inclination angle of an inner member.

4 Claims, 22 Drawing Sheets

U.S. PATENT DOCUMENTS 6,322,453 B1 * 11/2001 Ishiguro et al. ............. 464/111
2002/0028711 A1    3/2002 Ishiguro et al.
2006/0211502 A1 *  9/2006 Kawakatsu et al. ......... 464/111

FOREIGN PATENT DOCUMENTS

| JP | 57-68930 | 4/1982 |
|---|---|---|
| JP | 59-35730 | 3/1984 |
| JP | 7-151158 | 6/1995 |
| JP | 08-338439 | 12/1996 |
| JP | 09-151952 | 6/1997 |
| JP | 10-096430 | 4/1998 |
| JP | 10-184717 | 7/1998 |
| JP | 11-210776 | 3/1999 |
| JP | 2001-208090 | 3/2001 |

* cited by examiner (1ST COMPARATIVE EXAMPLE)

FIG. 19 (2ND COMPARATIVE EXAMPLE)

PRIOR ART

CONSTANT VELOCITY JOINT

TECHNICAL FIELD

The present invention relates to a constant-velocity joint for connecting a transmission shaft to another transmission shaft in the drive power transmitting mechanism of an automobile, for example.

BACKGROUND ART

Heretofore, the drive power transmitting mechanisms of automobiles employ a constant-velocity joint for connecting a transmission shaft to another transmission shaft to transmit rotational power to axles.

FIG. 20 shows in cross section a part of a conventional constant-velocity joint 2 of the above type (see Japanese Laid-Open Patent Publication No. 10-184717).

The constant-velocity joint 2 comprises a tubular outer member 4 connected to a transmission shaft and an inner member 6 inserted in the outer member 4 and connected to another transmission shaft. The outer member 4 has three axially extending guide grooves 8 defined in an inner circumferential surface thereof. The inner member 6 has three trunnions 10 projecting respectively into the guide grooves 8. Rollers 14 are mounted on the respective trunnions 10 by needle bearings 12. The rollers 14 rollingly engage in the guide grooves 8 of the outer member 4.

With the conventional constant-velocity joint 2, in order to hold the needle bearings 12 against dislodgment from the rollers 14, circular grooves 16 are defined in the inner circumferential surfaces of the rollers 14, and the needle bearings 12 are press-fitted in the respective grooves 16.

For mounting a needle bearing 12 in a groove 16, all its needle bearing rollers except one needle bearing roller are annularly arrayed in and along the groove 16, and then the remaining needle bearing roller is press-fitted according to the keystone effect. In order to retain the needle bearing rollers neatly in the groove 16, the needle bearing rollers and the groove 16 need to be machined precisely for minimizing the tolerances of the dimensions of the groove 16 and the dimensions of the needle bearing rollers.

When a groove 16 is to be formed in the inner circumferential surface of a roller 14, since flanges 17a, 17b are to be provided on both sides of the groove 16, a machining tool is inserted into the groove 16 and cuts the groove 16. Chips produced when the groove 16 is cut need to be reliably discharged. Therefore, the machining process is highly difficult to perform.

Japanese Laid-Open Patent Publication No. 10-184717 discloses a technique for forming a round hole free of the flanges 17a, 17b and thereafter bringing two washers into engagement with the inner circumferential surface as a substitute for the flanges 17a, 17b, rather than forming the groove 16 in the inner circumferential surface of the roller 14. Though the round hole itself can easily be machined, it is necessary to machine engaging grooves where the washers are placed to engage the inner circumferential surface of the roller 14. It is also necessary to perform a process of bringing the washers into the engaging grooves.

In an attempt to solve the above problems, HONDA MOTOR CO., LTD. has proposed a constant-velocity joint 18 having a structure shown in FIG. 21 (see Japanese Laid-Open Patent Publication No. 11-210776).

The constant-velocity joint 18 includes an inner member 6 including a trunnion 10 with a larger-diameter portion 19 disposed on its proximal end. A roller 14 has a flange 17a disposed only on an end of the inner circumferential surface thereof in the direction in which the trunnion 10 projects.

With the above structure, the chips can easily be discharged when the inner circumferential surface of the roller 14 is machined or processed. A needle bearing 12 mounted between the trunnion 10 and the roller 14 is held in position between the flange 17a of the roller 14 and a step 20 provided by the larger-diameter portion 19 of the inner member 6.

Another conventional constant-velocity joint of this type is shown in FIG. 22 (see Japanese Laid-Open Patent Publication No. 2001-208090).

As shown in FIG. 22, the constant-velocity joint has a roller mechanism 26 including a retaining ring 24 retained by a circumferential groove 23 and mounted on an axial end of a cylindrical inner circumferential surface 22 of a roller 21, and a retaining flange 25 disposed on the other axial end of the cylindrical inner circumferential surface 22 and integrally formed with the roller 21.

A plurality of needle rollers 27 are mounted on the cylindrical inner circumferential surface 22, and held in place by a support ring 29 that is fitted over the outer circumferential surface of a trunnion 28.

With the roller mechanism 26 disclosed in Japanese Laid-Open Patent Publication No. 2001-208090, the retaining ring 24 is disposed at a distal end 28a of the trunnion 28, and the retaining flange 25 is disposed at a proximal end 28b of the trunnion 28.

DISCLOSURE OF THE INVENTION

Problems to be Solved by the Invention

The constant-velocity joint 18 shown in FIG. 21 is required to have the larger-diameter portion 19 disposed on the proximal end of the trunnion 10. Since the larger-diameter portion 19 needs to appropriately limit the distance that the needle bearing 12 moves along the trunnion 10, the larger-diameter portion 19 needs to be machined with high accuracy. The shape to which the larger-diameter portion 19 is machined is greatly limited in order to prevent stresses from concentrating on the area between the cylindrical portion of the trunnion 10 and the step 20 of the larger-diameter portion 19.

With the constant-velocity joint 2 shown in FIG. 20, as the angle θ of tilt of the axis T2 of the shaft (inner member 6) with respect to the axis T1 of the outer member 4 varies, the rollers 14 mounted on the trunnions 10 are displaced in the directions indicated by the arrow E. Since the displacement of the rollers 14 increases as the angle θ of tilt of the inner member 6 increases, the rollers 14 would interfere with the proximal ends 10a of the trunnions 10, limiting the angle θ of tilt unless the trunnions 10 are sufficiently long. However, increasing the length of the trunnions 10 would increase the diameter of the outer member 4, resulting in an increase in the size of the constant-velocity joint 2.

If the retaining ring 24 of the roller mechanism 26 shown in FIG. 22 is dislodged from the circumferential groove 23 for some reasons, then the needle rollers 27 placed between the cylindrical inner circumferential surface 22 of the roller 21 and the support ring 29 will be ejected out of the roller 21, tending to impair a rotational drive power transmitting function of the constant-velocity joint.

It is a general object of the present invention to provide a constant-velocity joint which includes an inner member that can easily be machined precisely, which can easily be assembled, and which can be manufactured with increased productivity at a reduced cost.

A major object of the present invention is to provide a constant-velocity joint which includes a transmission shaft tilted at a desired angle of tilt and trunnions whose lengths are optimized for reducing the size of the constant-velocity joint.

Another object of the present invention is to provide a constant-velocity joint which is prevented from impairing a rotational drive power transmitting function thereof even if a retaining member is dislodged from a roller.

According to the present invention, for assembling a roller on a trunnion, an annular member is installed on the trunnion, and then the roller with a plurality of rolling elements disposed on an inner circumferential surface thereof is fitted over the trunnion. The rolling elements are retained between a flange of the roller and the annular member. The roller can be assembled on the trunnion more efficiently if the rolling elements are placed in advance on the inner circumferential surface of the roller using grease or wax.

The annular member for retaining the rolling elements is separate from the trunnion, and hence can be machined with increased freedom. The distance that the rolling elements are movable with respect to the trunnion can easily and precisely be adjusted by selecting the thickness of the annular member.

If the area of the annular member which abuts against the proximal end of the trunnion beveled, then the annular member can be mounted stably on the trunnion, thereby increasing the durability of the annular member and the trunnion.

The ratio of a radius of curvature of an outer circumferential surface of the trunnion which extends from a cylindrical portion of the trunnion, onto which the roller is fit, to the proximal end thereof to a diameter of the cylindrical portion is set to a range from 0.05 to 0.35. With this ratio range, a good layout is achieved, and stresses concentrating on the proximal end are reduced for increased durability of the trunnion.

According to the present invention, the inner circumferential surface of the roller with the rolling elements mounted thereon can easily and precisely be machined. The shape of the proximal end of the trunnion can be desired with high freedom, allowing an inner member of sufficient mechanical strength to be easily manufactured. The inner member can easily be assembled simply by mounting the rolling elements on the inner circumferential surface of the roller and thereafter fitting the roller over the trunnion with the annular member mounted thereon. Consequently, the productivity of the constant-velocity joint is increased, and the manufacturing cost thereof is lowered.

According to the present invention, a gap H between the proximal end of the trunnion and the rolling elements or the roller may be set with respect to a distance δ by which the roller is movable with respect to the proximal end, according to the relationship:

$$H > \delta = R/2 \cdot (1/\cos \theta \max - 1)$$

where R represents the radius of rotation of the center of the roller around a central axis of the outer member; and θ max: the maximum angle of tilt of another transmission shaft with respect to one transmission shaft.

The gap H for achieving the desired maximum angle θ max of tilt is set on the basis of the distance δ by which the roller is movable with respect to the proximal end of the trunnion, allowing the trunnion to have an appropriate length for making the constant-velocity joint small in size.

If the rolling elements mounted on the inner circumferential surface of the roller are retained between a flange of the roller near the projecting end of the trunnion and the proximal end of the trunnion, then the gap H may be set as the distance between the ends of the rolling elements and the proximal end. If the rolling elements are alternatively retained between first and second flanges on respective both ends of the roller, then the gap H may be set as the distance between the end of the roller and the proximal end.

If the roller has a flange disposed only on the end thereof near the projecting end of the trunnion, then a step may be provided on the proximal end of the trunnion for limiting the movement of the rolling elements to the proximal end. In this case, the gap H is set as the distance between the rolling elements and the step. If a radius of curvature of the outer circumferential surface of the trunnion which extends from the cylindrical portion to the step is smaller than a radius of curvature of the ends of the rolling elements near the proximal end, then the step serves as a surface for abutment against the rolling elements, preventing the transmission shaft from being excessively tilted.

The ratio of the radius of curvature of the outer circumferential surface of the trunnion which extends from the cylindrical portion of the trunnion to the proximal end thereof to the diameter of the cylindrical portion is set to a range from 0.05 to 0.35. With this ratio range, a good layout is achieved and stresses concentrating on the proximal end are reduced for increased durability of the trunnion.

A distance M between the projecting end of the trunnion and the ends of the rolling elements may be set with respect to a distance ε by which the rolling elements are movable with respect to the projecting end, according to the relationship:

$$M > \epsilon = 3R/2 \cdot (1/\cos \theta \max - 1)$$

With the above distance setting, the rolling elements can be held stably on the trunnion within an allowable range of angles of tilt.

According to the present invention, the transmission shaft can be tilted at a desired angle of tilt, allowing the trunnion to have an appropriate length for making the constant-velocity joint small in size.

According to the present invention, furthermore, a flange may be disposed on an end of the roller in an axial direction of an inside-diameter surface thereof and projects radially inwardly, and a retaining member may be mounted on another end of the roller in an annular groove for retaining the rolling elements, the retaining member being disposed near a proximal end of the trunnion in an axial direction thereof.

With the above arrangement, an axial thickness (L+ΔA) of a portion of the roller with the retaining member mounted thereon on one side of a central axis C extending diametrically across the roller may be greater than an axial thickness (L) of another portion of the roller with the flange disposed thereon on the other side of the central axis C, the central line C being in agreement with a center of the rolling elements (B1=B2) which divides an axial length thereof into two equal dimensions. The retaining member may comprise at least a circlip.

According to the present invention, the retaining member is mounted on the proximal end of the trunnion in the axial direction thereof. Even if the retaining member is dislodged from the annular groove for some reasons, since the retaining member is not mounted on the distal end of the trunnion, the rolling elements placed on the inside-diameter surface of the roller are retained by the flange of the roller under centrifugal forces generated by the rotation of the constant-velocity joint, and hence are prevented from being ejected from the inside-diameter surface of the roller. As a consequence, the constant-velocity joint has its rotational drive power transmitting function prevented from being impaired.

BEST MODE FOR CARRYING OUT THE INVENTION

Figure 1:
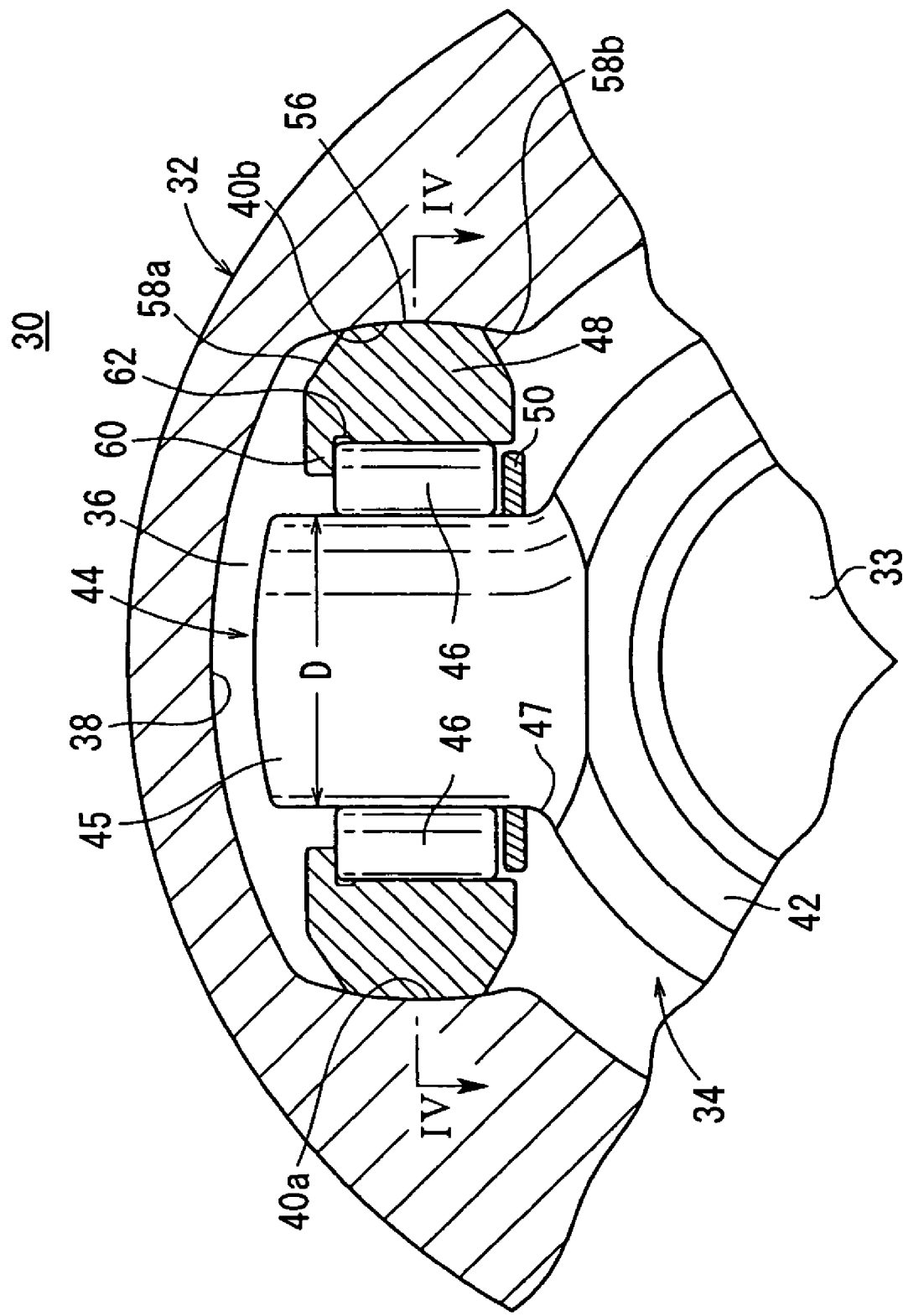
FIG. 1 is a fragmentary vertical cross-sectional view of a constant-velocity joint according to a first embodiment of the present invention, the view being taken along a direction perpendicular to the axis of the constant-velocity joint.

FIG. 1 is a fragmentary vertical cross-sectional view of a constant-velocity joint 30 according to a first embodiment of the present invention, the view being taken along a direction perpendicular to the axis of the constant-velocity joint. The constant-velocity joint 30 basically comprises a tubular outer member 32 connected to an end of a transmission shaft, not shown, and having an opening, and an inner member 34 connected to another transmission shaft 33 and inserted in an internal space of the outer member 32.

The outer member 32 has three axially extending guide grooves 36 defined in the internal space thereof which are angularly spaced at 120-degree intervals around the axis. Each of the guide grooves 36 comprises a ceiling 38 having a gradually curved cross section and a pair of sliding faces 40a, 40b disposed on both sides of the ceiling 38 in confronting relation to each other and having an arcuate cross section.

The inner member 34 comprises a ring-shaped spider 42 fitted over the transmission shaft 33. The spider 42 has three trunnions 44 integrally formed with the outer circumferential surface thereof and projecting into the respective guide grooves 36. Each of the trunnions 44 has a cylindrical portion 45 smoothly joined into the outer circumferential surface of the spider 42 through a proximal end 47 of the trunnion 44.

Figure 2:
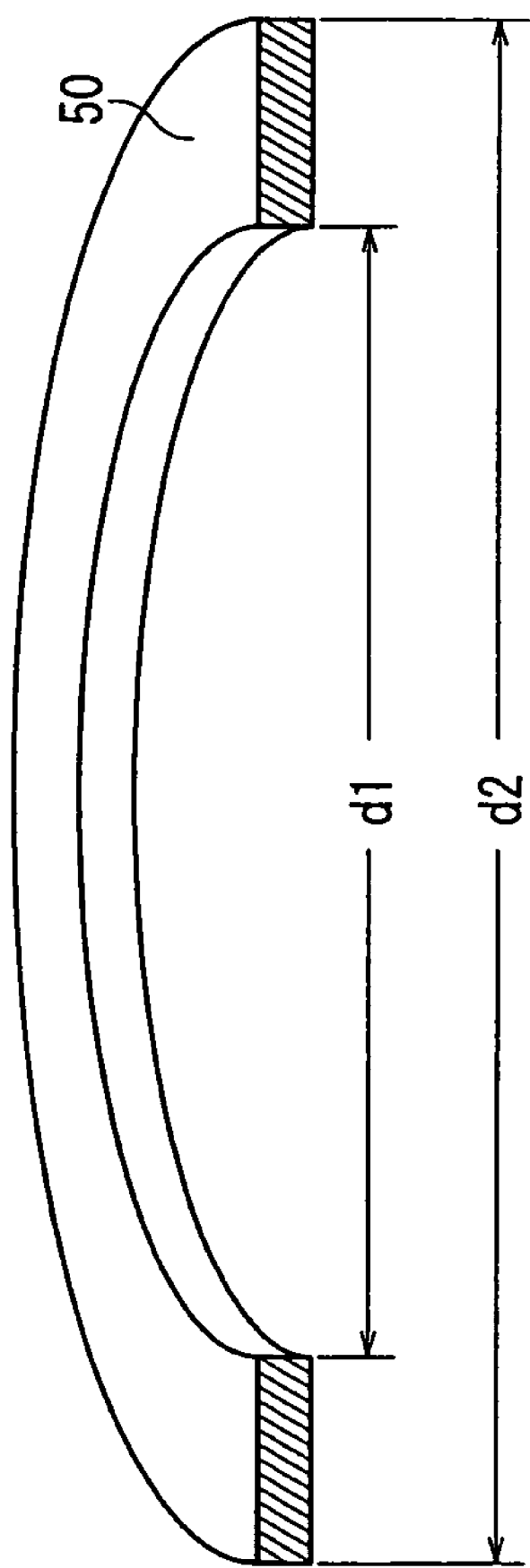
FIG. 2 is a perspective view, partly in cross section, of an annular member of the constant-velocity joint according to the first embodiment.
Figure 3:
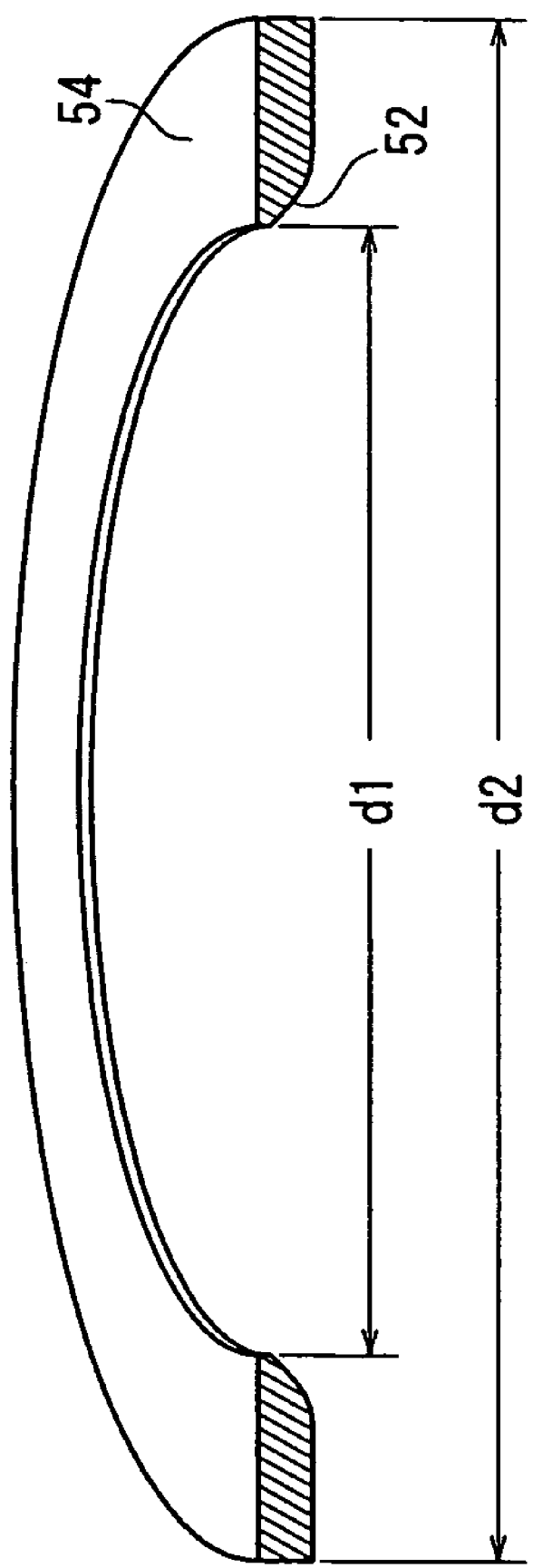
FIG. 3 is a perspective view, partly in cross section, of another annular member of the constant-velocity joint according to the first embodiment.

As shown cross-sectionally in FIG. 2, an annular member 50 having an inside diameter d1 slightly greater than the diameter D of the cylindrical portion 45 and an outside diameter d2 is mounted on the cylindrical portion 45 of the trunnion 44. Instead of the annular member 50, an annular member 54 shown in FIG. 3 which has a beveled surface 52 for abutment against the proximal end 47 of the trunnion 44 may be mounted on the cylindrical portion 45 of the trunnion 44. If the annular member 54 is mounted thereon, then since the beveled surface 52 abuts against the proximal end 47 of the trunnion 44, the annular member 54 is stably held on the trunnion 44.

Figure 4:
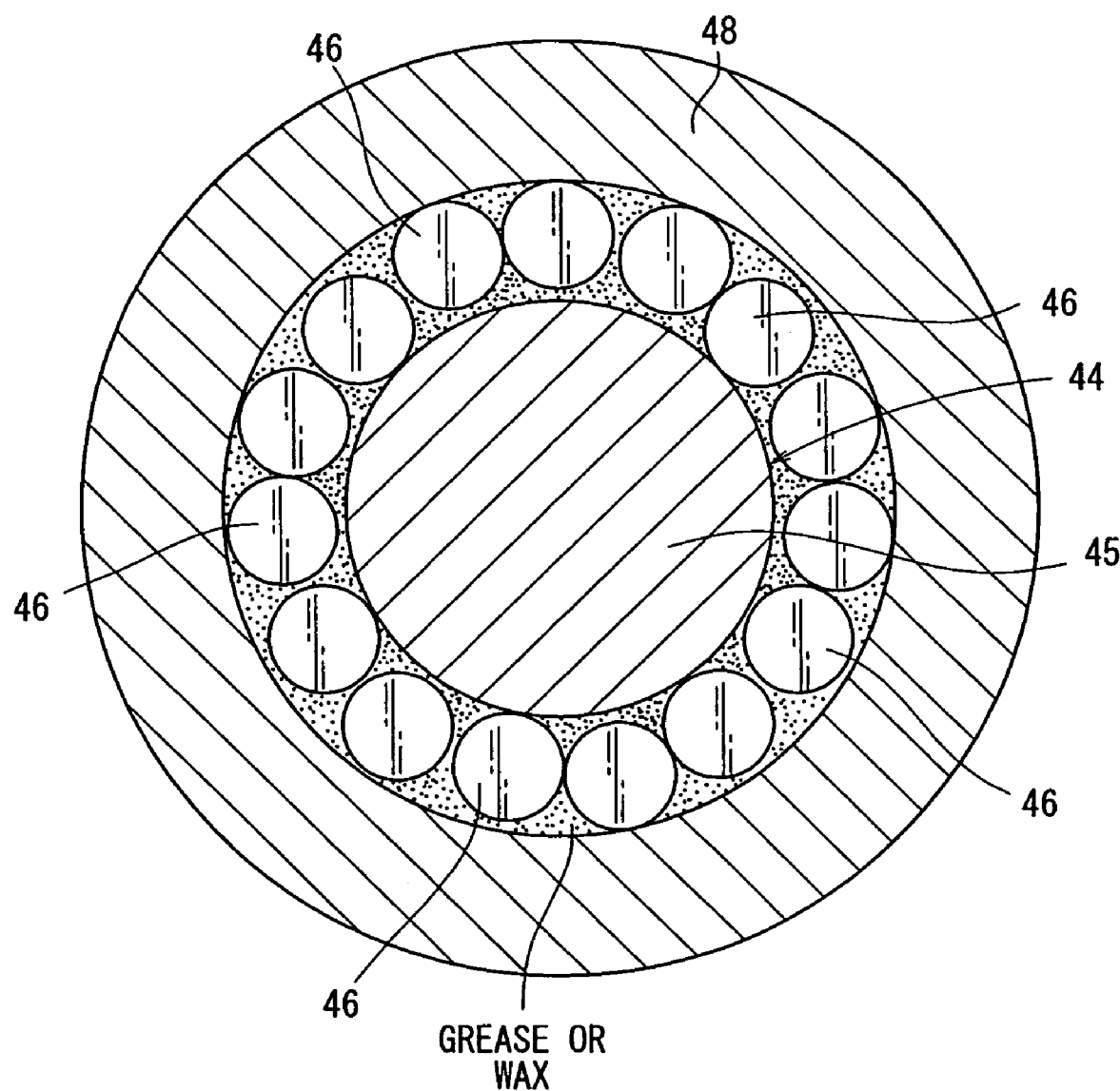
FIG. 4 is a transverse cross-sectional view taken along line IV-IV of FIG. 1, showing an assembled state of a trunnion, a needle bearing, and a roller of the constant-velocity joint according to the first embodiment.

A ring-shaped roller 48 is fitted over the cylindrical portion 45 of the trunnion 44 with a plurality of needle bearing rollers (rolling elements) 46 interposed therebetween. As shown in FIG. 4, the needle bearing rollers 46 are retained between the outer circumferential surface of the cylindrical portion 45 and the inner circumferential surface of the roller 48 with grease or wax interposed therebetween.

As shown in FIG. 1, the outer circumferential surface of the roller 48 comprises an arcuate face 56 shaped complementarily to the cross-sectional shapes of the sliding faces 40a, 40b, a first annular slanted face 58a extending continuously from the arcuate face 56 toward the ceiling 38 of the guide groove 36, and a second annular slanted face 58b extending continuously from the arcuate face 56 toward the spider 42.

A radially inwardly projecting flange 60 is disposed on an end face of the inner circumferential surface of the roller 48 near the ceiling 38 of the guide groove 36. No flange is disposed on an end face of the inner circumferential surface of the roller 48 near the spider 42. Therefore, the inner circumferential surface of the roller 48 can easily and precisely be machined by a machining tool, not shown, which is inserted into the roller 48. Chips that are produced when the inner circumferential surface of the roller 48 is machined can easily be discharged.

The inside diameter of the roller 48 is slightly greater than the outside diameter d2 of the annular member 50 or the annular member 54 mounted on the trunnion 44. A circumferential slot 62 is defined in the inner circumferential surface of the roller 48 at the proximal end of the flange 60 for reducing the sliding resistance to the needle bearing rollers 46 and functioning as an oil reservoir for holding grease or wax.

Figure 5:
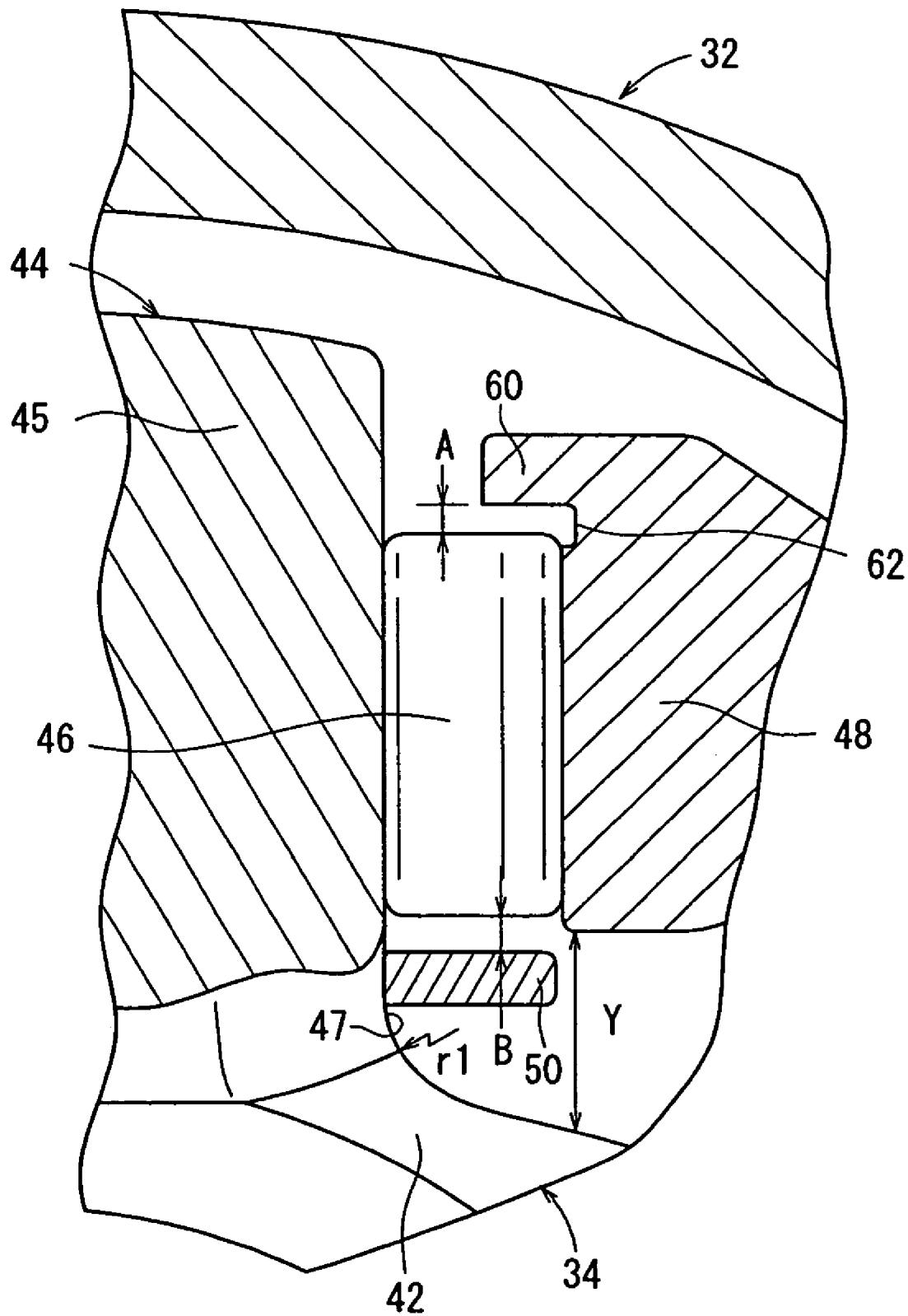
FIG. 5 is an enlarged fragmentary vertical cross-sectional view of the constant-velocity joint according to the first embodiment.

As shown in FIG. 5, a gap from the flange 60 of the roller 48 to an end face of the needle bearing roller 46 is represented by A, a gap from the other face of the needle bearing roller 46 to the annular member 50 or the annular member 54 by B, and a gap from the end face of the roller 48 near the spider 42 to the spider 42 by Y. A gap X (=A+B) and the gap Y are established such that a smaller one of the gap X and the gap Y represents a range to which the movement of the roller 48 with respect to the trunnion 44 is limited.

The constant-velocity joint 30 according to the first embodiment of the present invention is basically constructed as described above. A process of assembling the constant-velocity joint 30 and operation and advantages of the constant-velocity joint 30 will be described below.

For assembling the constant-velocity joint 30, the annular member 50 is mounted on each of the cylindrical portions 45 of the trunnions 44. Annular member 50, whose inside diameter d1 is slightly greater than the diameter D of the cylindrical portion 45, is held on the proximal end 47 of the cylindrical portion 45, as shown in FIG. 5.

The needle bearing rollers 46 are mounted on the inner circumferential surface of the roller 48 with grease or wax interposed therebetween. Since the flange 60 is disposed only on one end of the inner circumferential surface of the roller 48, the needle bearing rollers 46 can easily be mounted in place by being inserted from the end face of the roller 48 toward the flange 60.

Then, the roller 48 with the needle bearing rollers 46 mounted therein is installed on each of the cylindrical portions 45 of the trunnions 44, completing the inner member 34. The needle bearing rollers 46 are held between the flange 60 of the roller 48 and the annular member 5.0 mounted on the cylindrical portion 45 of the trunnion 44.

The inner member 34 thus constructed is inserted into the internal space of the outer member 32, and the rollers 48 are brought into engagement in the guide grooves 36, whereupon the process of assembling the constant-velocity joint 30 shown in FIG. 1 is completed.

As shown in FIG. 5, the gaps A and B (the gap X=A+B) are provided between one end face of the needle bearing roller 46 and the flange 60 of the roller 48, and between the other end face of the needle bearing roller 46 and the annular member 50, and the gap Y is provided between the end face of the roller 48 which is free of the flange 60 and the spider 42 of the inner member 34.

Therefore, when the transmission shaft 33 of the inner member 34 is rotated while being held at a certain angle with respect to the non-illustrated transmission shaft of the outer member 32, the roller 48 is displaced axially along the trunnion 44 by a distance that is limited by a smaller one of the gap X and the gap Y.

Since the annular member 50 is separate from the trunnion 44, the gap X for limiting the distance that the roller 48 is movable can be adjusted as desired by selecting the thickness of the annular member 50, for example. Furthermore, because the annular member 50 can have a flat face which faces the end face of the needle bearing roller 46, the proximal end 47 of the trunnion 44 can have a radius r1 of curvature set to a desired radius for keeping the trunnion 44 strong and also for setting the gap B between the annular member 50 and the needle bearing roller 46 to a highly accurate value.

Figure 6:
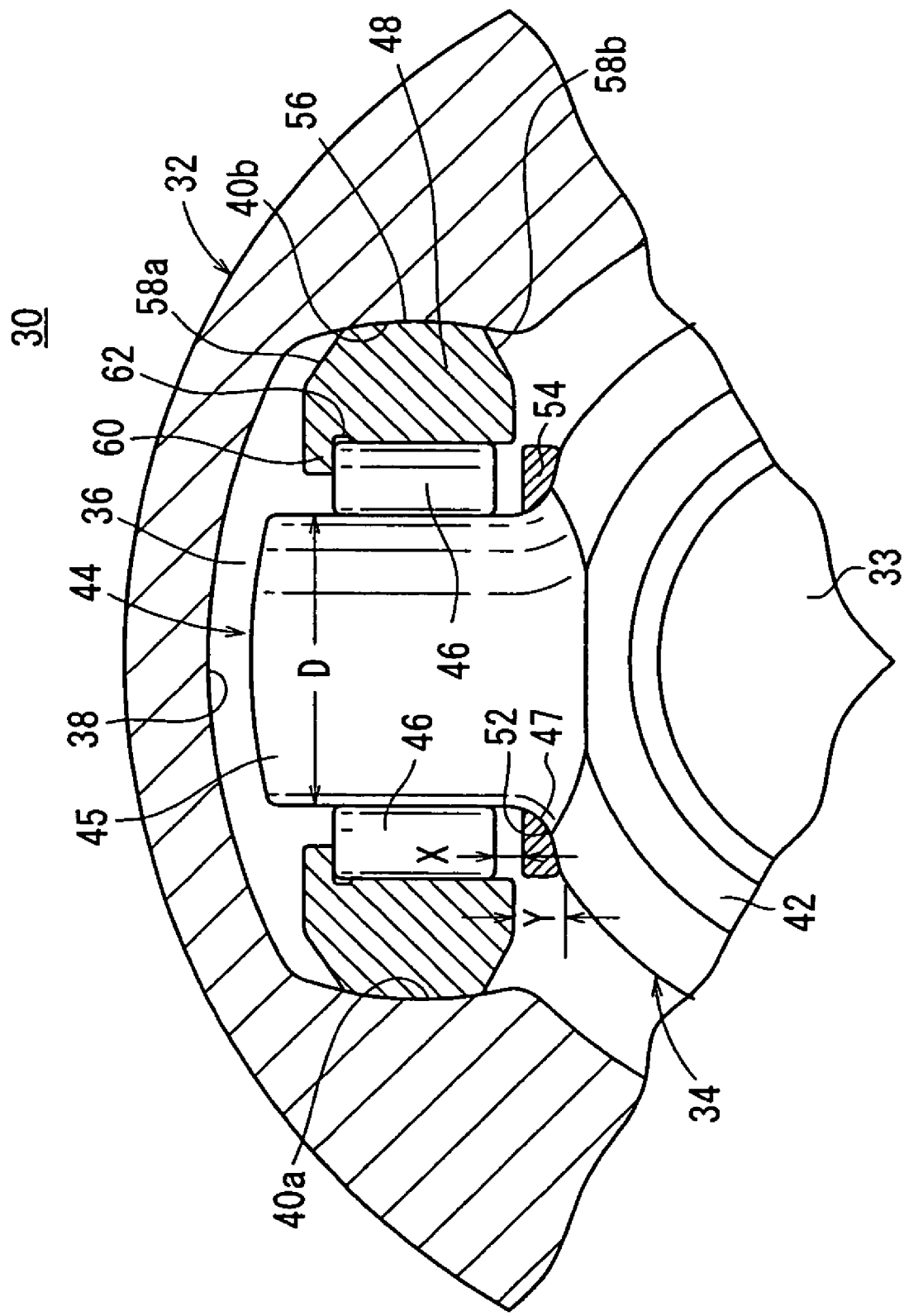
FIG. 6 is a fragmentary vertical cross-sectional view of a constant-velocity joint according to a second embodiment of the present invention, the view being taken along a direction perpendicular to the axis of the constant-velocity joint.

Instead of the annular member 50, as shown in FIG. 6, an annular member 54 having a beveled surface 52 may be mounted on the proximal end 47 of the trunnion 44, so that the beveled surface 52 of the annular member 54 is held in abutment against the curved surface of the proximal end 47 for holding the annular member 54 stably in position.

Figure 7:
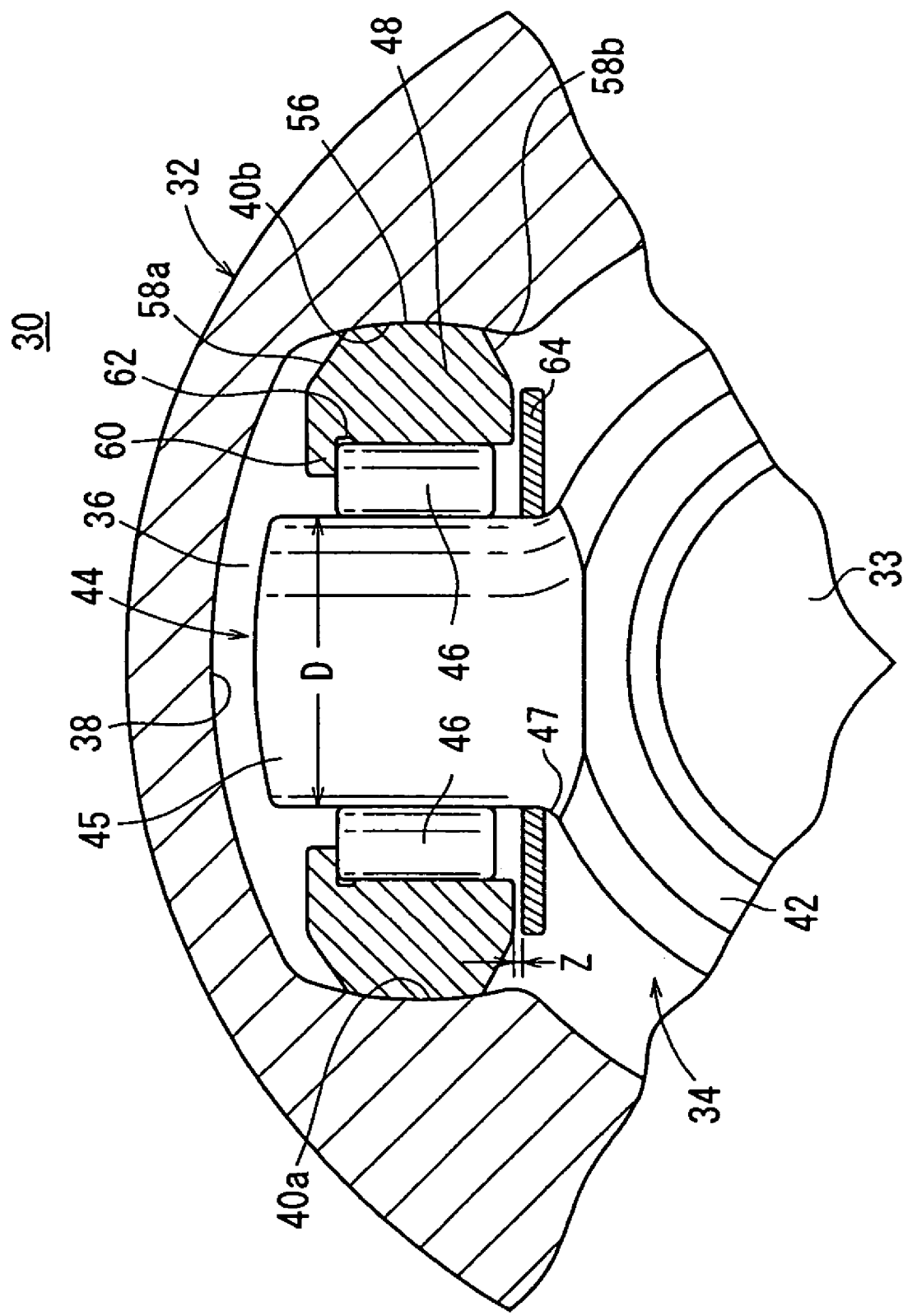
FIG. 7 is a fragmentary vertical cross-sectional view of a constant-velocity joint according to a third embodiment of the present invention, the view being taken along a direction perpendicular to the axis of the constant-velocity joint.

As shown in FIG. 7, an annular member 64 having an outside diameter d2 greater than the diameter of the inner circumferential surface of the roller 48 may be mounted on the trunnion 44, so that the distance that the roller 48 is movable can be limited by a gap Z between the end face of the roller 48 and the annular member 64.

Figure 8:
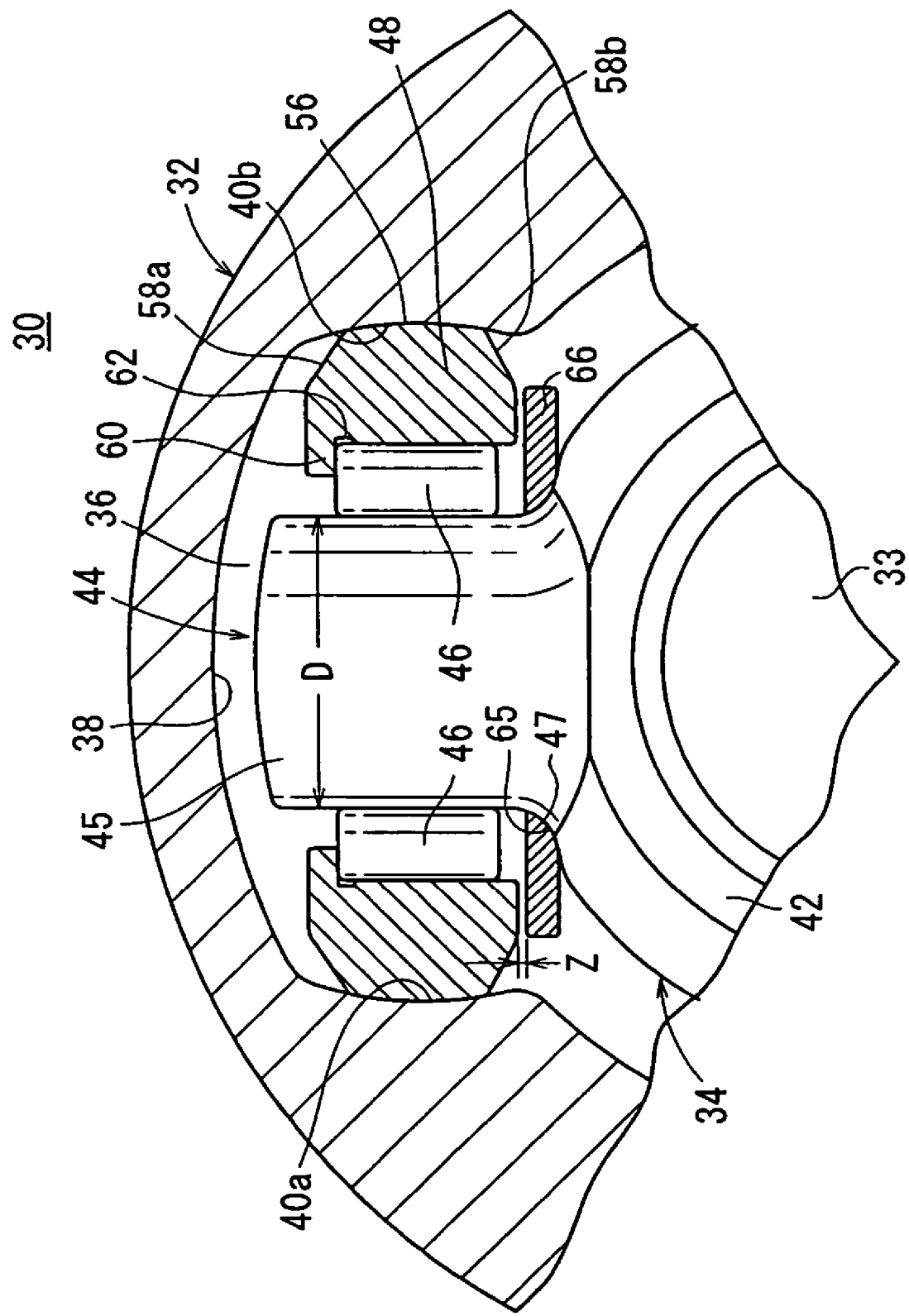
FIG. 8 is a fragmentary vertical cross-sectional view of a constant-velocity joint according to a fourth embodiment of the present invention, the view being taken along a direction perpendicular to the axis of the constant-velocity joint.

Similarly, as shown in FIG. 8, an annular member 66 having an outside diameter d2 greater than the diameter of the inner circumferential surface of the roller 48 and having a beveled surface 65 near the proximal end 47 may be mounted on the trunnion 44, so that the distance that the roller 48 is movable can be limited by a gap Z between the end face of the roller 48 and the annular member 66.

Figure 9:
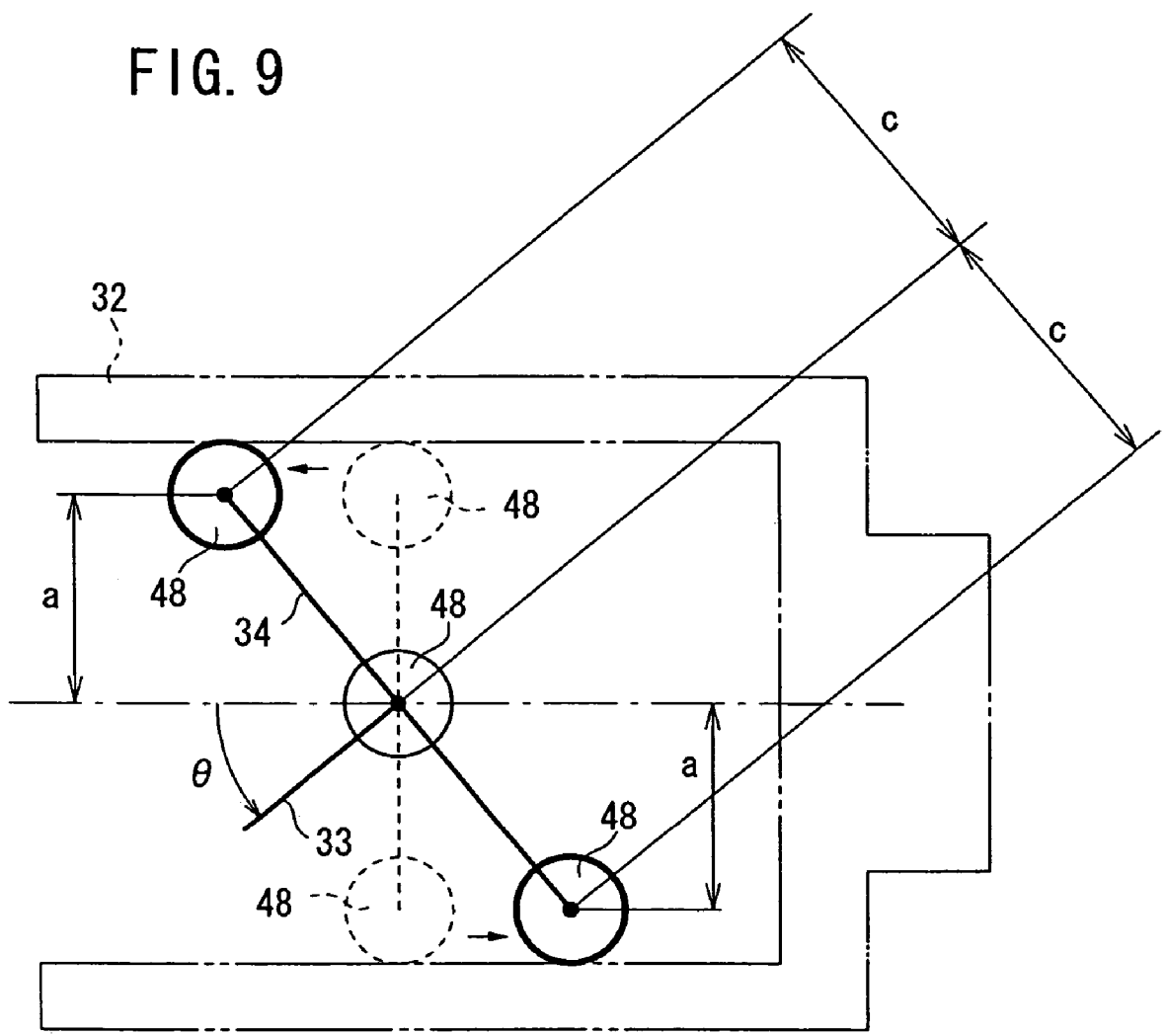
FIG. 9 is a schematic side elevational view of the constant-velocity joint according to the first embodiment.
Figure 10:
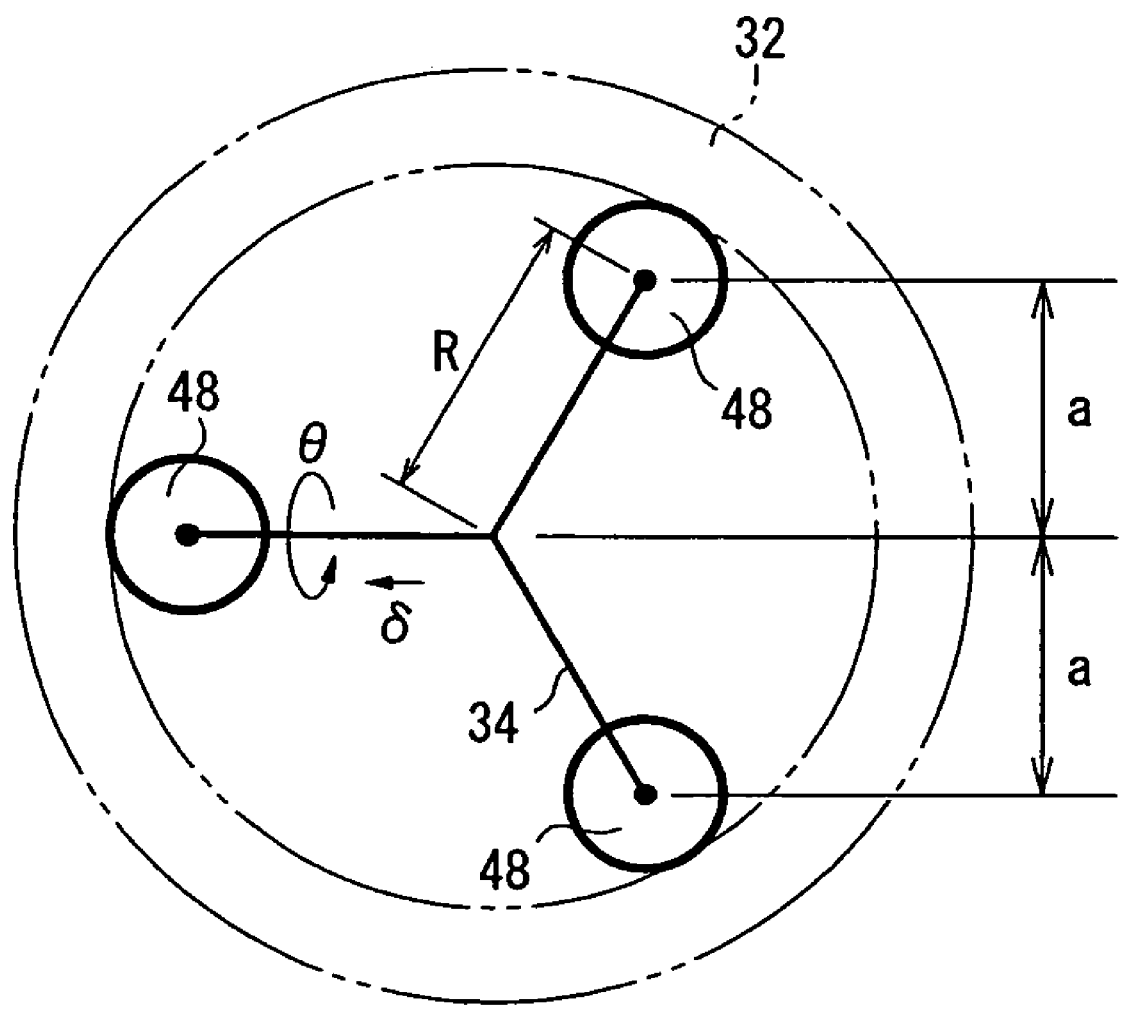
FIG. 10 is a schematic front elevational view of the constant-velocity joint according to the first embodiment.

In each of the above embodiments, the gap between the needle bearing roller 46 and the annular member 50, 54 or the gap between the roller 48 and the annular member 64, 66 may be set as follows:

FIG. 9 is a schematic side elevational view of the constant-velocity joint in which the inner member 34 is tilted by the angle θ of tilt about the axis of one of the trunnions 44; and FIG. 10 is a schematic front elevational view of the constant-velocity joint in that state.

If the radius of rotation of the center of each of the rollers 48 around the central axis of the outer member 32 is represented by R, then the distance "a" from a plane including the axis of the trunnion 44 about which the angle θ of tilt is defined and the central axis of the outer member 32 to the center of each of the rollers 48 that have moved along the guide grooves 36 of the outer member 32 is expressed by:

$$a = R \cdot \cos 30°$$

The distance "c" from the axis of the trunnion 44 as the center of rotation to the center of each of the rollers 48 that have moved along the guide grooves 36 of the outer member 32 is expressed, using the distance "a", as follows:

$$c = a/\cos \theta$$

Each of the rollers 48 that have moved along the guide grooves 36 is moved outwardly of the trunnion 44 by a distance "b" that is expressed as follows:

$$b = c - a$$

Therefore, each of the rollers 48 mounted on the trunnion 44 about which the angle θ of tilt is defined is moved inwardly of the trunnion 44 by a distance δ that is expressed as follows:

$$\delta = b \cdot \tan 30°$$
$$= R/2 \cdot (1/\cos\theta - 1)$$

Based on the above result, a gap K (corresponding to the gap X) between the needle bearing roller 46 and the annular member 50, 54 or a gap K (corresponding to the gap Z) between the roller 48 and the annular member 64, 66 is designed to be a minimum gap K which satisfies the following relationship:

$$K > \delta = R/2 \cdot (1/\cos\theta\,\text{max} - 1)$$

where θ max represents the maximum angle of tilt of the inner member 34. In this manner, the desired angle θ of tilt can be achieved, and the axial lengths of the trunnions 44 are optimized so that the inner member 34 has a minimum size required, making the constant-velocity joint 30 small in size.

The distance that the roller 48 is moved axially outwardly along the trunnion 44 can be determined by fixing two of the three rollers 48 in position, moving the remaining one roller 48 slidingly along the guide groove 36 of the outer member 32, and finding the distance that the remaining one roller 48 is moved axially outwardly along the trunnion 44. The distance ε is expressed as follows:

$$\epsilon = 3R/2 \cdot (1/\cos\theta - 1)$$

For holding the roller 48 stably on the trunnion 44, therefore, it is preferable to design a distance M (see FIG. 12) from the end of the needle bearing roller 46 to the projecting end of the trunnion 44 in order to satisfy the following relationship:

$$M > \epsilon = 3R/2 \cdot (1/\cos\theta\,\text{max} - 1)$$

The results of a test conducted to adjust a ratio r1/D of the radius r1 of curvature (see FIG. 5) of the curved surface from the cylindrical portion 45 to the proximal end 47 to the diameter D of the cylindrical portion 45, and to judge the mechanical strength of the trunnion 44 in relation to the layout of the inner member 34 and the roller 48 are shown in Table 1. The trunnion 44 can have a good mechanical strength by setting the ratio r1/D to 0.05≦r1/D or 0.08≦r1/D. If the ratio r1/D is set to 0.35≦r1/D, then the inner member 34 has an increased amount of material, posing a layout problem. By setting the ratio r1/D to 0.05≦r1/D≦0.35 or preferably 0.08≦r1/D≦0.25, a good layout can be achieved, and a stress concentration on the proximal end 47 can be reduced to keep the trunnion 44 sufficiently strong.

Figure 11:
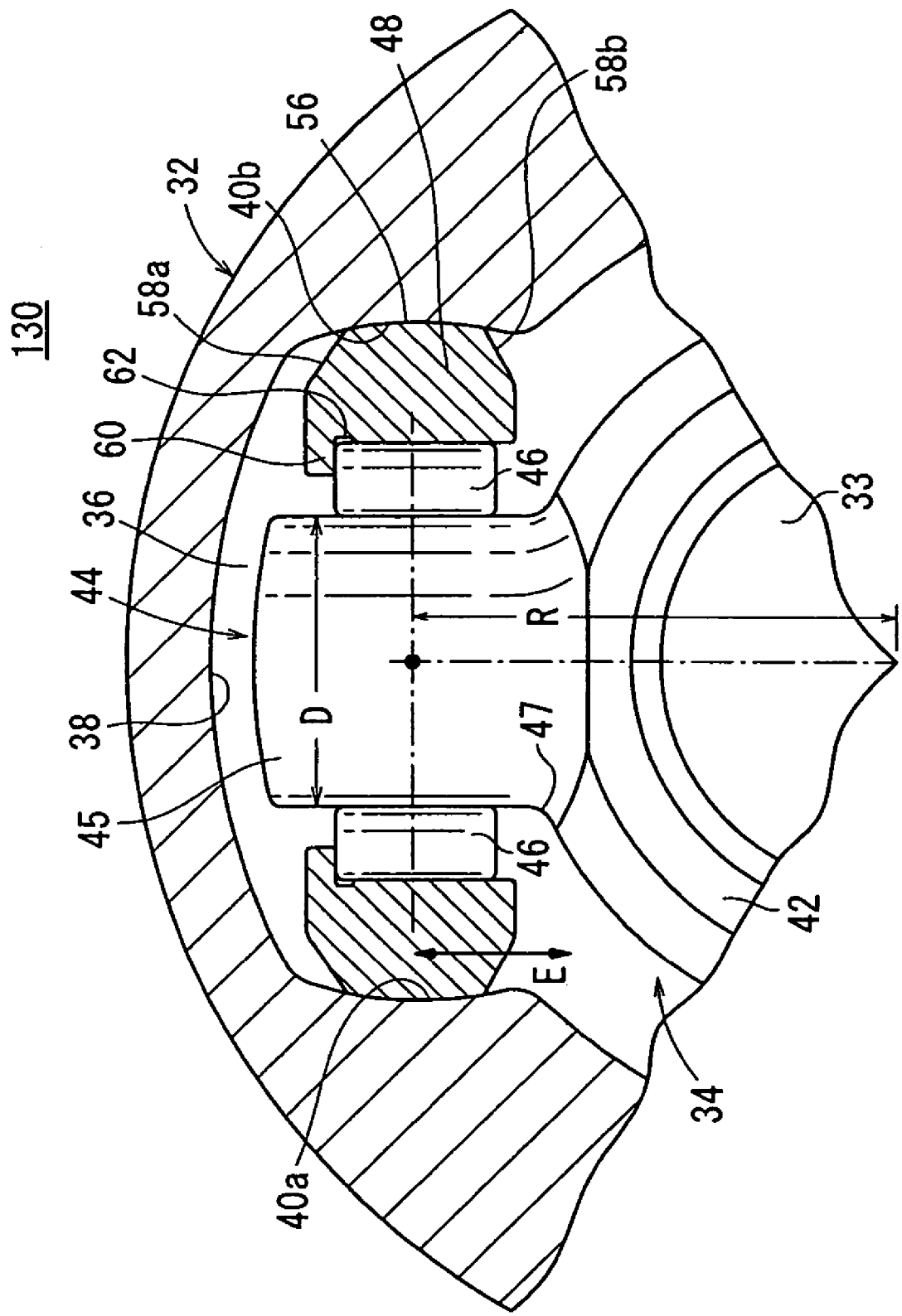
FIG. 11 is a fragmentary vertical cross-sectional view of a constant-velocity joint according to a fifth embodiment of the present invention, the view being taken along a direction perpendicular to the axis of the constant-velocity joint.

A constant-velocity joint 130 according to a fifth embodiment of the present invention is shown in FIG. 11. In embodiments to be described below, those components which are identical to those of the constant-velocity joint 30 according to the first embodiment are denoted by identical reference characters, and will not be described in detail below.

The constant-velocity joint 130 according to the fifth embodiment includes a spider 42 having three trunnions 44 integrally formed therewith which project into the respective guide grooves 36. The cylindrical portions 45 of the trunnions 44 and the outer circumferential surface of the spider 42 smoothly joined into each other.

A ring-shaped roller 48 is fitted over the cylindrical portion 45 of the trunnion 44 with a plurality of needle bearing rollers (rolling elements) 46 interposed therebetween. The needle bearing rollers 46 and the roller 48 can be displaced in the directions indicated by the arrow E along the axis of the cylindrical portion 45 of the trunnion 44.

Figure 12:
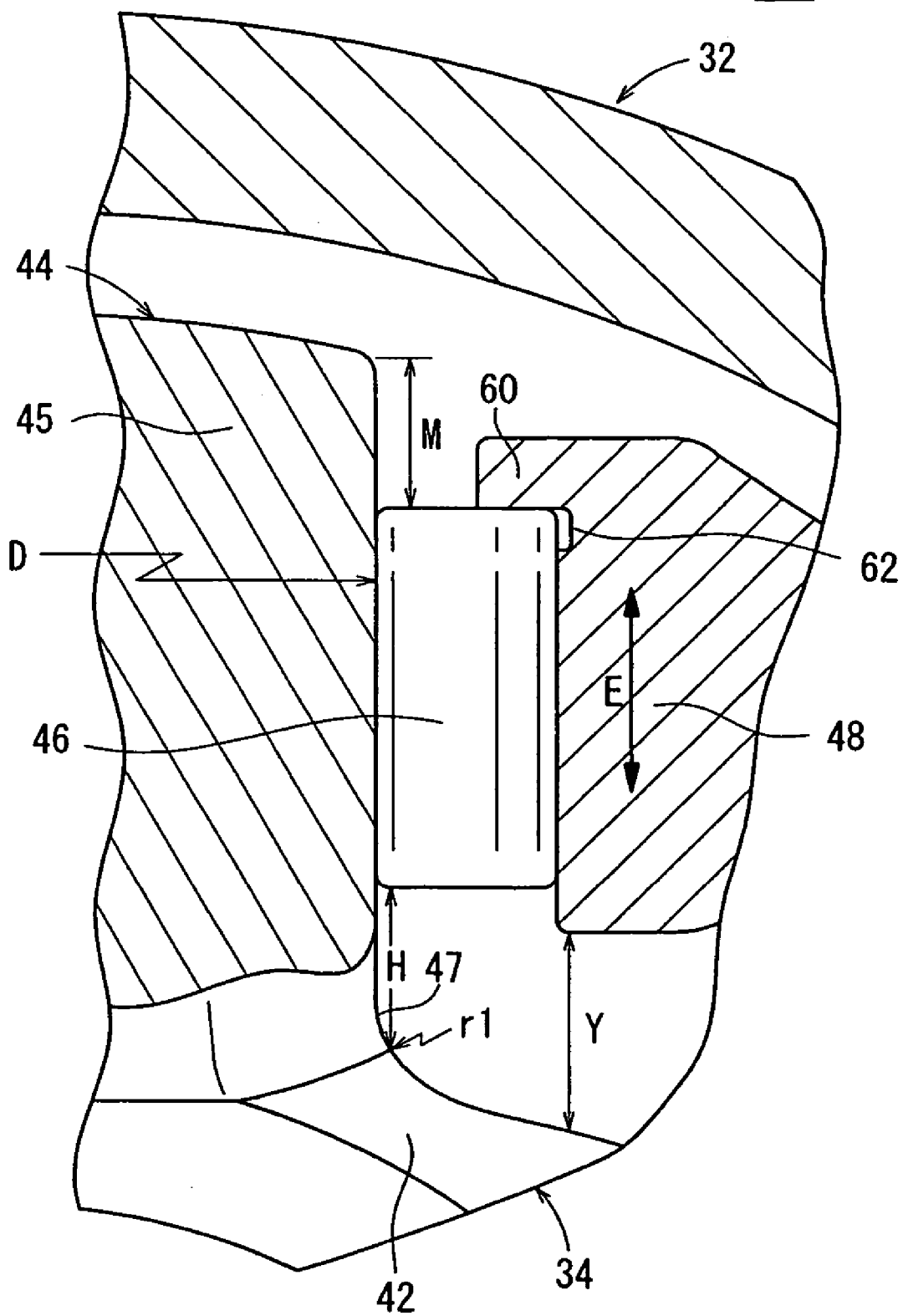
FIG. 12 is an enlarged fragmentary vertical cross-sectional view of the constant-velocity joint according to the fifth embodiment.

As shown in FIGS. 11 and 12, a gap H from the end of the needle bearing roller 46 near the inner member 34 to the proximal end 47 of the inner member 34, i.e., a distance that the needle bearing roller 46 travels until it abuts against the proximal end 47, is set to satisfy:

$$H > R/2 \cdot (1/\cos\theta\,\text{max} - 1)$$

where θ max represents the maximum angle of tilt of the inner member 34 with respect to the outer member 32 and R the radius of rotation of the center of the roller 48 around the axis of the transmission shaft 33 of the inner member 34 (the central axis of the outer member 32).

If a gap Y (see FIG. 12) from the end of the roller 48 near the inner member 34 to the spider 42 of the inner member 34 is Y<H, then since the roller 48 abuts against the inner member 34 earlier than the needle bearing roller 46, the gap Y is set to satisfy:

$$Y > R/2 \cdot (1/\cos\theta\,\text{max} - 1)$$

A distance M (see FIG. 12) between the projecting end of the cylindrical portion 45 of the trunnion 44 and the end of the needle bearing roller 46 is set to satisfy:

$$M > 3R/2 \cdot (1/\cos\theta\,\text{max} - 1)$$

The constant-velocity joint 130 according to the fifth embodiment of the present invention is basically constructed as described above. A process of assembling the constant-velocity joint 130 and operation and advantages of the constant-velocity joint 130 will be described below.

The needle bearing rollers 46 are mounted on the inner circumferential surface of the roller 48 with grease or wax interposed therebetween. Since the flange 60 is disposed only on one end of the inner circumferential surface of the roller 48, the needle bearing rollers 46 can easily be mounted in place by being inserted from the end face of the roller 48 toward the flange 60.

Then, the roller 48 with the needle bearing rollers 46 mounted therein is installed on each of the cylindrical portions 45 of the trunnions 44, completing the inner member 34.

TABLE 1

| r1/D | 0.01 | 0.025 | 0.05 | 0.07 | 0.08 | 0.09 | 0.1 | 0.15 | 0.2 | 0.25 | 0.3 | 0.35 | 0.4 |
|---|---|---|---|---|---|---|---|---|---|---|---|---|---|
| Strength | x | x | Δ | Δ | ○ | ○ | ○ | ○ | ○ | ○ | ○ | ○ | ○ |
| Layout | ○ | ○ | ○ | ○ | ○ | ○ | ○ | ○ | ○ | ○ | Δ | Δ | x |

○: Good
Δ: Substantially good
x: Not good

The needle bearing rollers 46 are held between the flange 60 of the roller 48 and the proximal end 47 of the trunnion 44.

The inner member 34 thus constructed is inserted into the internal space of the outer member 32, and the rollers 48 are brought into engagement in the guide grooves 36, whereupon the process of assembling the constant-velocity joint 130 shown in FIG. 11 is completed.

Operation of the constant-velocity joint 130 will be described below.

When the transmission shaft 33 rotates, the needle bearing rollers 46 and the rollers 48 are rotated by the trunnions 44 of the inner member 34, and the rotation is transmitted through the guide grooves 36 to the outer member 32, thereby rotating the non-illustrated transmission shaft.

Figure 20:
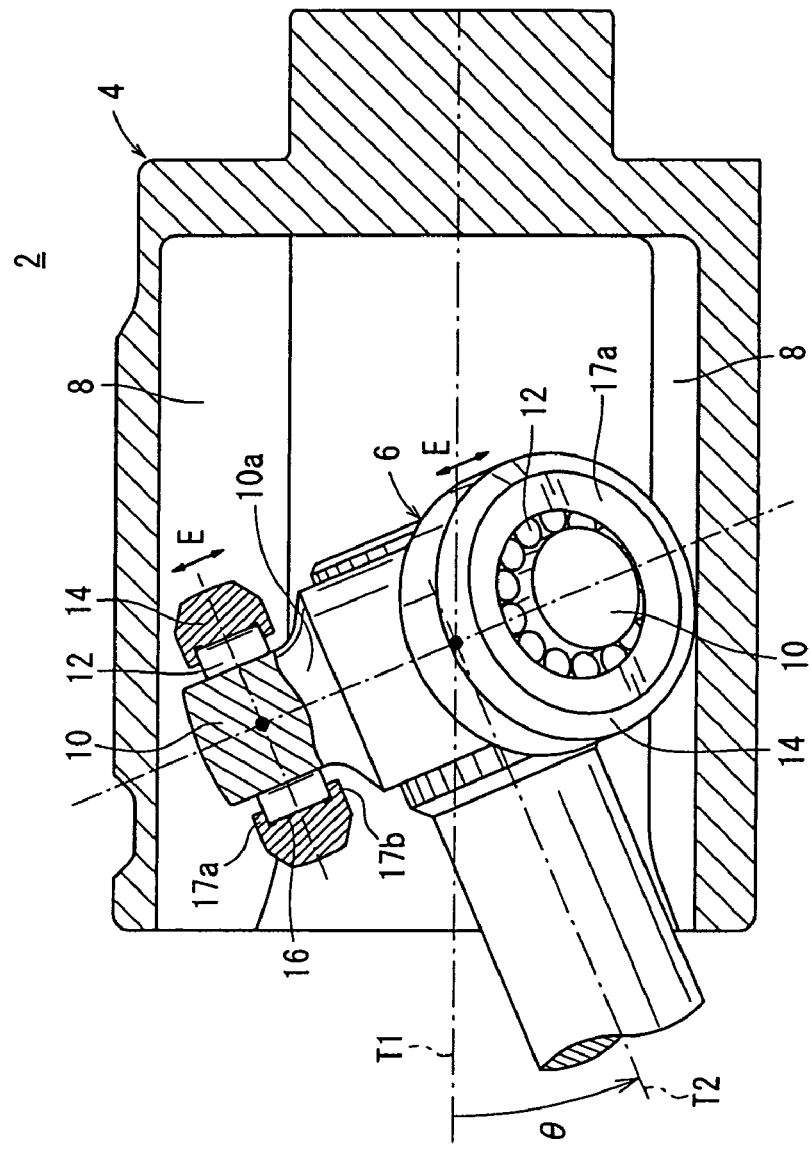
FIG. 20 is a vertical cross-sectional view of a conventional constant-velocity joint, the view being taken along a direction perpendicular to the axis of the constant-velocity joint.
Figure 21:
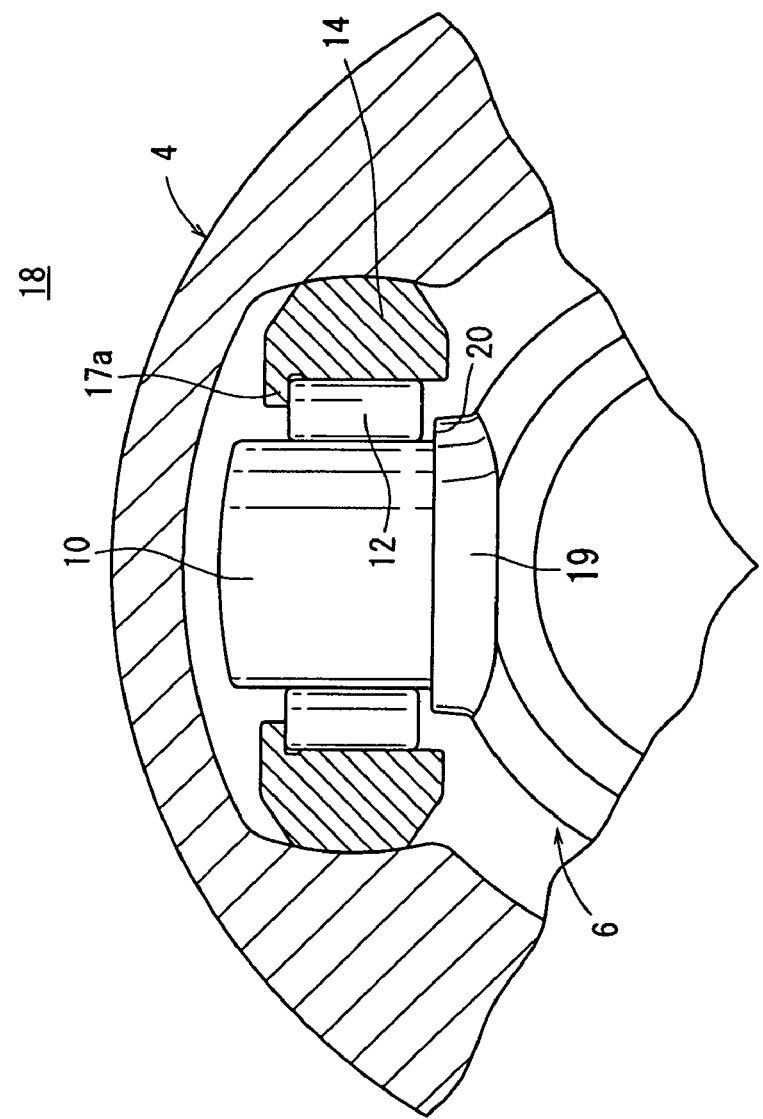
FIG. 21 is an enlarged fragmentary vertical cross-sectional view of a conventional constant-velocity joint, the view being taken along a direction perpendicular to the axis of the constant-velocity joint.
Figure 22:
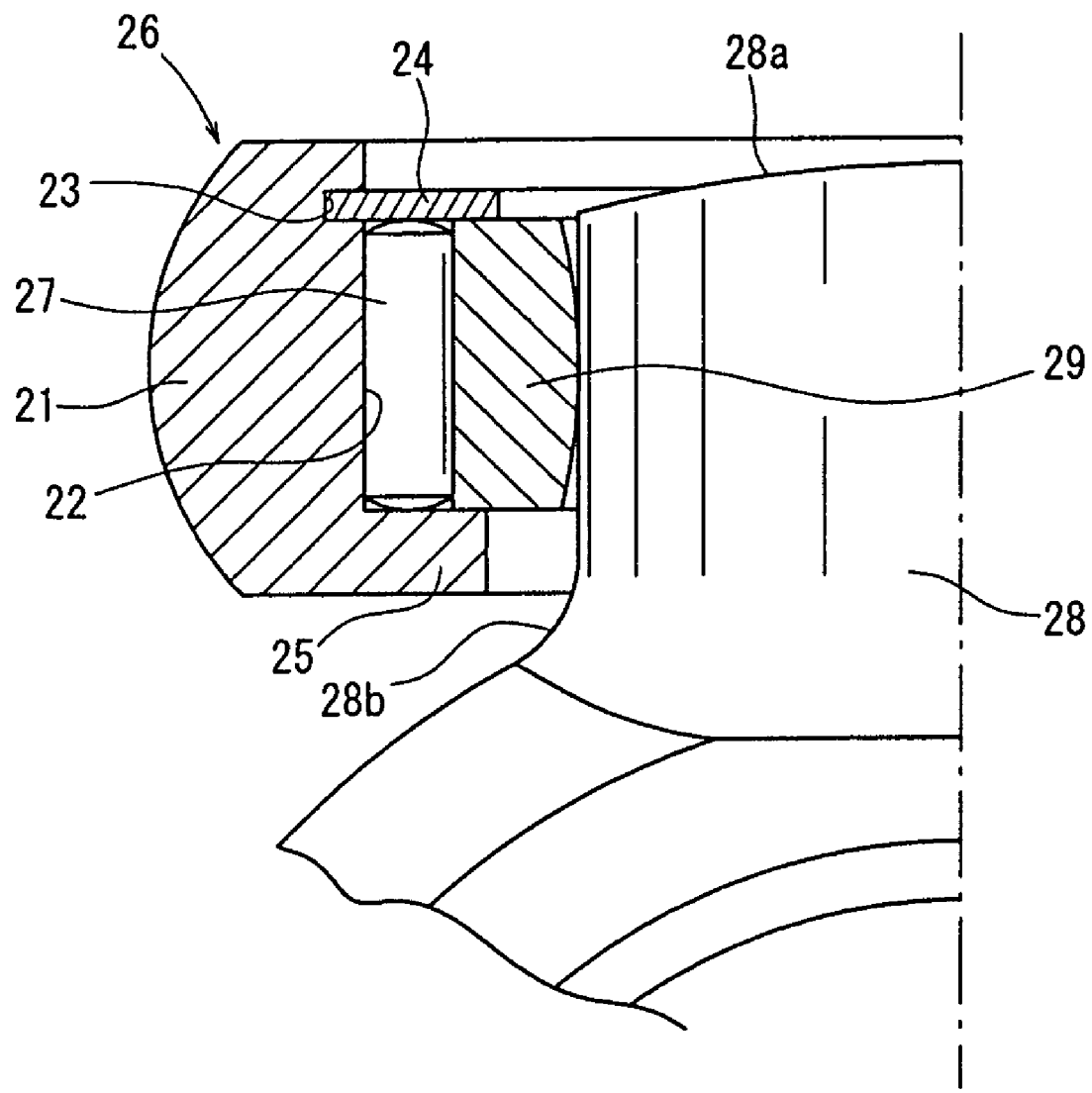
FIG. 22 is an enlarged vertical cross-sectional view, partly omitted from illustration, of a conventional constant-velocity joint, the view being taken along a direction perpendicular to the axis of the constant-velocity joint.

When the axis of the transmission shaft 33 of the inner member 34 is tilted by the angle θ of tilt with respect to the non-illustrated axis of the outer member 32, as shown in FIG. 20, each of the rollers 48 mounted on the trunnions 44 is moved along the guide groove 36 of the outer member 32, and is moved a distance (δ) depending on the angle θ of tilt in the axial directions (indicated by the arrow E) of the trunnion 44.

The relationship between the angle θ of tilt of the inner member 34 with respect to the outer member 32 and the distance δ that the roller 48 moves with respect to the trunnion 44 will be described below with reference to the schematic views shown in FIGS. 9 and 10.

FIG. 9 is a schematic side elevational view of the constant-velocity joint in which the inner member 34 is tilted by the angle θ of tilt about the axis of one of the trunnions 44, and FIG. 10 is a schematic front elevational view of the constant-velocity joint in that state.

If the radius of rotation of the center of each of the rollers 48 around the central axis of the outer member 32 is represented by R, then the distance "a" from a plane including the axis of the trunnion 44 about which the angle θ of tilt is defined and the central axis of the outer member 32 to the center of each of the rollers 48 that have moved along the guide grooves 36 of the outer member 32 is expressed by:

$$a = R \cdot \cos 30°$$

The distance "c" from the axis of the trunnion 44 as the center of rotation to the center of each of the rollers 48 that have moved along the guide grooves 36 of the outer member 32 is expressed, using the distance "a", as follows:

$$c = a/\cos \theta$$

Each of the rollers 48 that have moved along the guide grooves 36 is moved outwardly of the trunnion 44 by a distance "b" that is expressed as follows:

$$b = c - a$$

Therefore, each of the rollers 48 mounted on the trunnion 44 about which the angle θ of tilt is defined is moved inwardly of the trunnion 44 by a distance δ that is expressed as follows:

$$\delta = b \cdot \tan 30°$$
$$= R/2 \cdot (1/\cos\theta - 1)$$

Based on the above result, a gap H between the end of the needle bearing roller 46 and the proximal end 47 of the inner member 34 is designed to be a minimum gap H which satisfies the following relationship:

$$H > \delta = R/2 \cdot (1/\cos \theta \max - 1)$$

where θ max represents the maximum angle of tilt of the inner member 34. In this manner, the desired angle θ of tilt can be achieved, and the lengths of the trunnions 44 are optimized so that the inner member 34 has a minimum size required, making the constant-velocity joint 130 small in size.

The distance that the roller 48 is moved axially outwardly along the trunnion 44 can be determined by fixing two of the three rollers 48 in position, moving the remaining one roller 48 slidingly along the guide groove 36 of the outer member 32, and finding the distance that the remaining one roller 48 is moved axially outwardly along the trunnion 44. The distance ϵ is expressed as follows:

$$E = 3R/2 \cdot (1/\cos \theta - 1)$$

For holding the roller 48 stably on the trunnion 44, therefore, it is preferable to design a distance M (see FIG. 12) from the end of the needle bearing roller 46 to the projecting end of the trunnion 44 in order to satisfy the following relationship:

$$M > \epsilon = 3R/2 \cdot (1/\cos \theta \max - 1)$$

The ratio r1/D of the radius r1 of curvature (see FIG. 12) of the curved surface from the cylindrical portion 45 to the proximal end 47 to the diameter D of the cylindrical portion 45 can be adjusted to achieve a good mechanical strength of the trunnion 44 in relation to the layout of the inner member 34 and the roller 48, as with the constant-velocity joint 30 according to the first embodiment.

Figure 13:
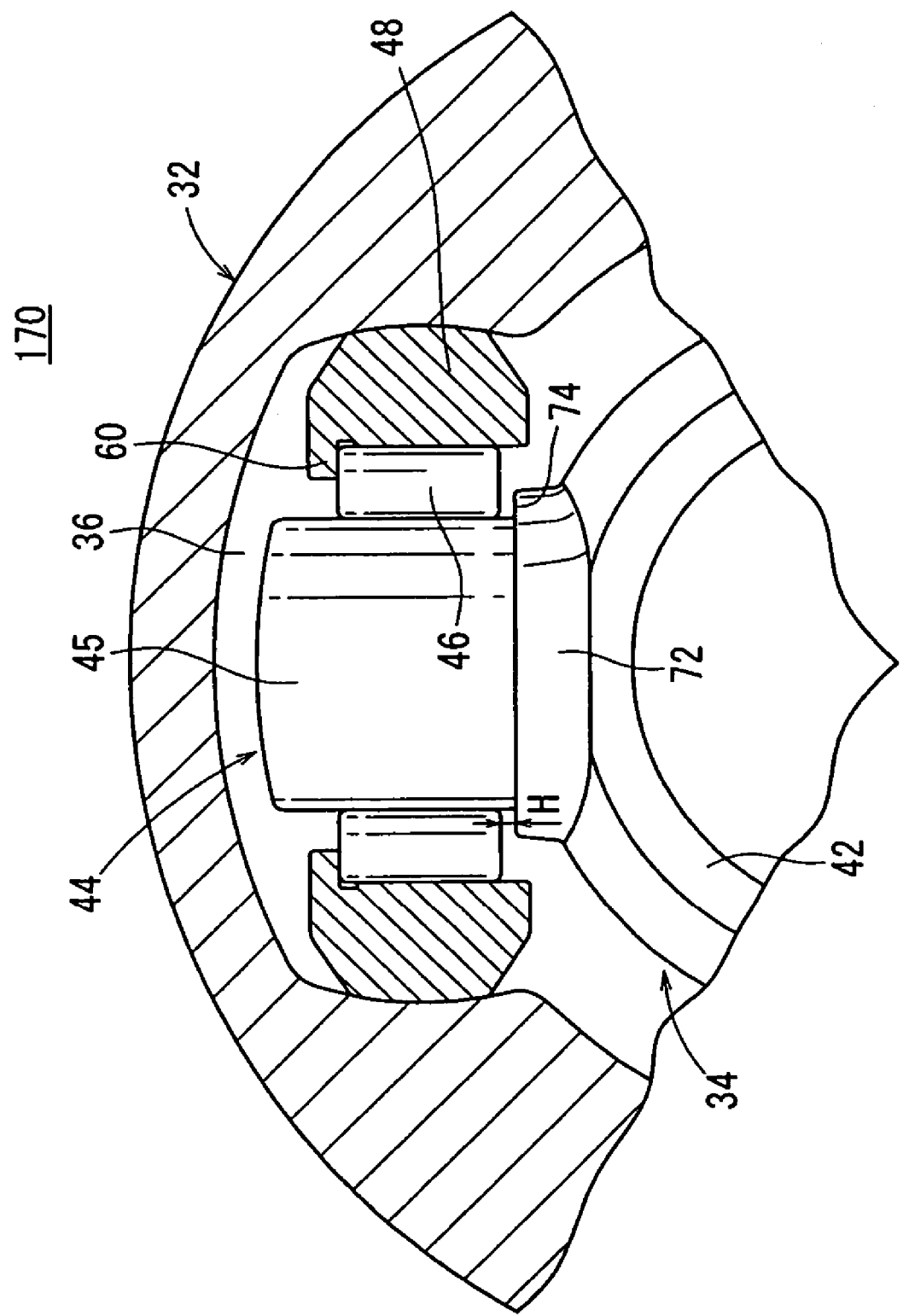
FIG. 13 is a fragmentary vertical cross-sectional view of a constant-velocity joint according to a sixth embodiment of the present invention, the view being taken along a direction perpendicular to the axis of the constant-velocity joint.

A constant-velocity joint 170 according to a sixth embodiment is shown in FIG. 13. The constant-velocity joint 170 has a step 74 on a proximal end 72 of the trunnion 44 for limiting the movement of the needle bearing rollers 46 toward the proximal end 72. A gap H required between the needle bearing rollers 46 and the proximal end 72 is set as the distance between the ends of the needle bearing rollers 46 and the step 74.

Figure 14:
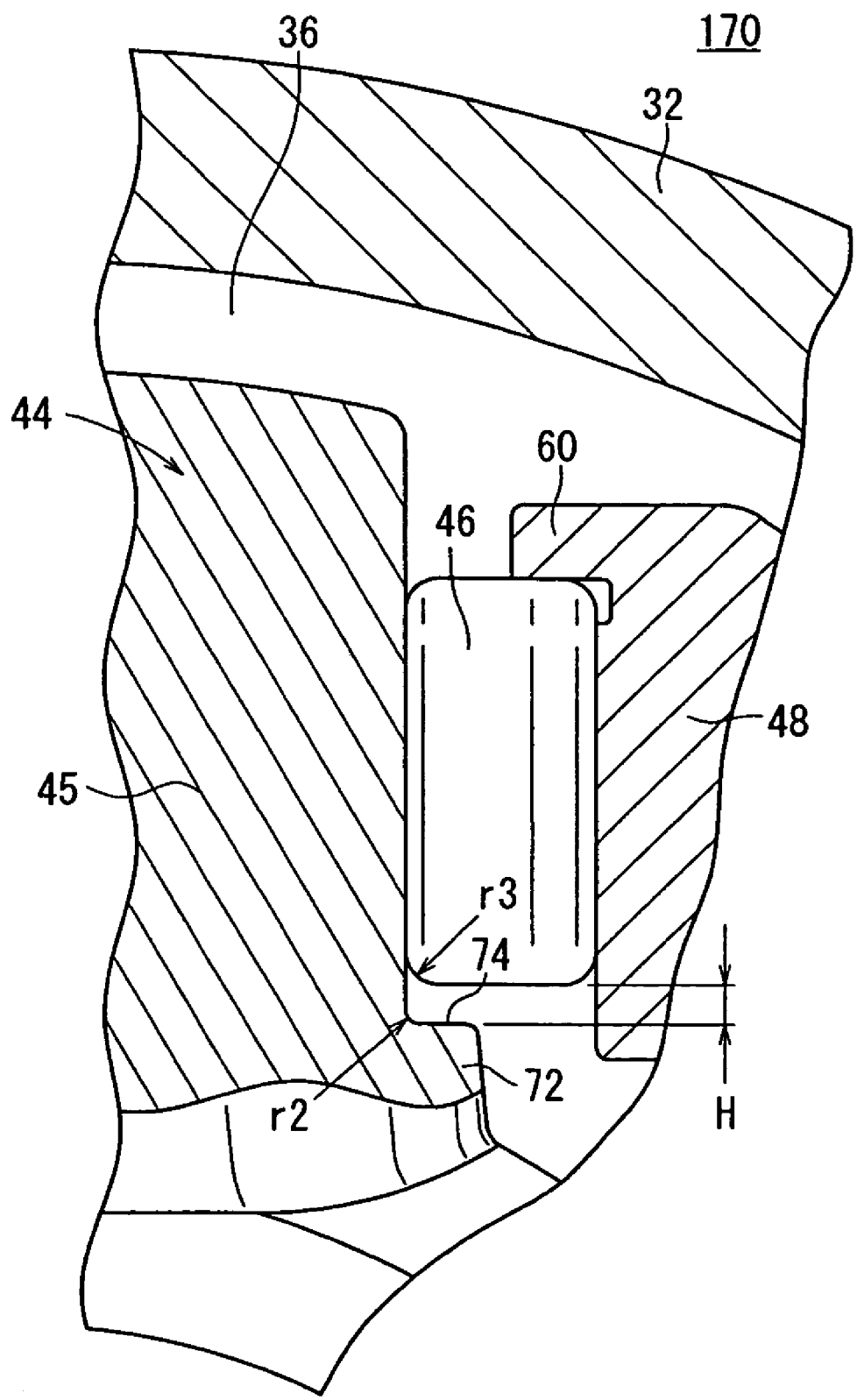
FIG. 14 is an enlarged fragmentary vertical cross-sectional view of the constant-velocity joint according to the sixth embodiment.

If the radius of curvature of the curved surface from the cylindrical portion 45 of the trunnion 44 to the step 74 is represented by r2 and the radius of curvature of a peripheral edge of the end of the needle bearing roller 46 near the step 74 by r3 (see FIG. 14), then these radii are set to the relationship r2<r3, thereby setting the gap H between the end of the needle bearing roller 46 and the step 74 precisely and using the step 74 as a surface for abutting against the needle bearing roller 46 for preventing the inner member 34 from being excessively tilted.

Figure 15:
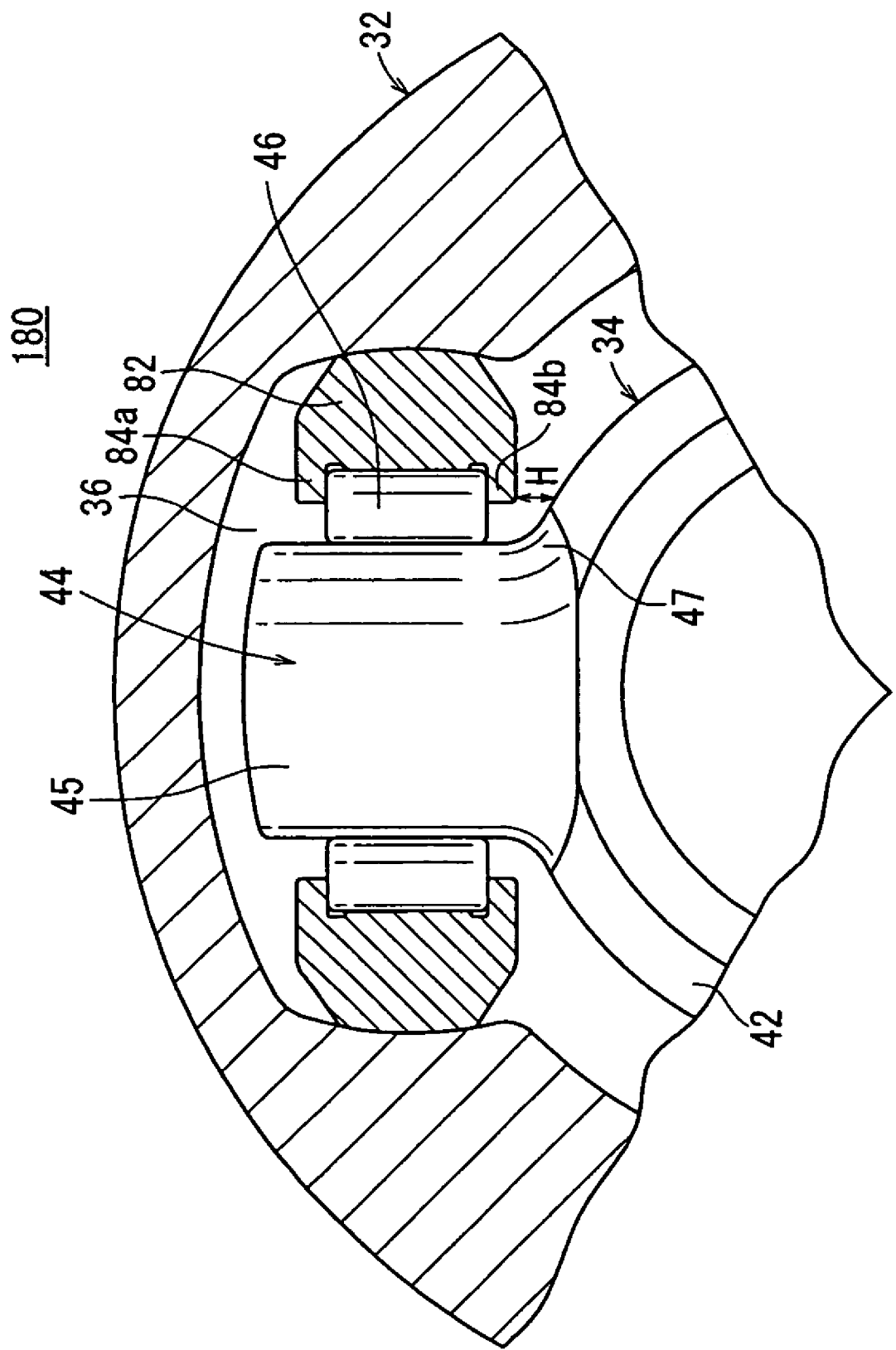
FIG. 15 is a fragmentary vertical cross-sectional view of a constant-velocity joint according to a seventh embodiment of the present invention, the view being taken along a direction perpendicular to the axis of the constant-velocity joint.

A constant-velocity joint 180 according to a seventh embodiment is shown in FIG. 15. The constant-velocity joint 180 has a first flange 84a and a second flange 84b disposed on respective opposite ends of the inner circumferential surface of a roller 82, and needle bearing rollers 46 are held between the first flange 84a and the second flange 84b.

With the constant-velocity joint 180 thus constructed, since the roller 82 abuts against the proximal end 47 of the trunnion 44, the gap H is set as the distance between the second flange 84b of the roller 82 and the proximal end 47 of the trunnion 44.

Figure 16:
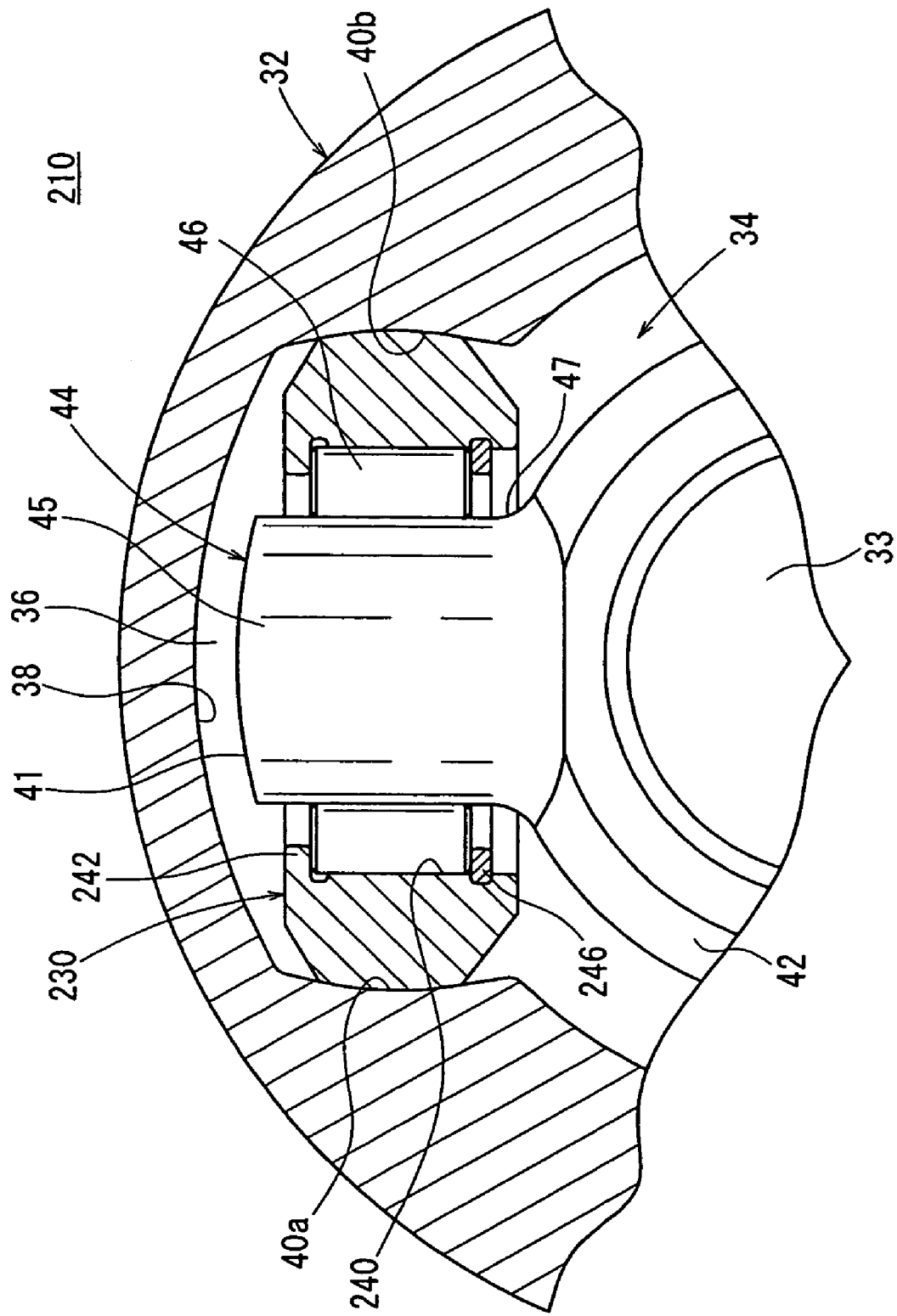
FIG. 16 is a fragmentary vertical cross-sectional view of a constant-velocity joint according to an eighth embodiment of the present invention, the view being taken along a direction perpendicular to the axis of the constant-velocity joint.

A tripod constant-velocity joint 210 according to an eighth embodiment of the present invention is shown in FIG. 16.

The constant-velocity joint 210 according to the eighth embodiment has trunnions 44 and ring-shaped rollers 230 each fitted over one of the respective trunnions 44 with a plurality of needle bearing rollers 46 functioning as rolling elements. The needle bearing rollers 46 may be replaced with roller bearings including rollers or the like.

Figure 17:
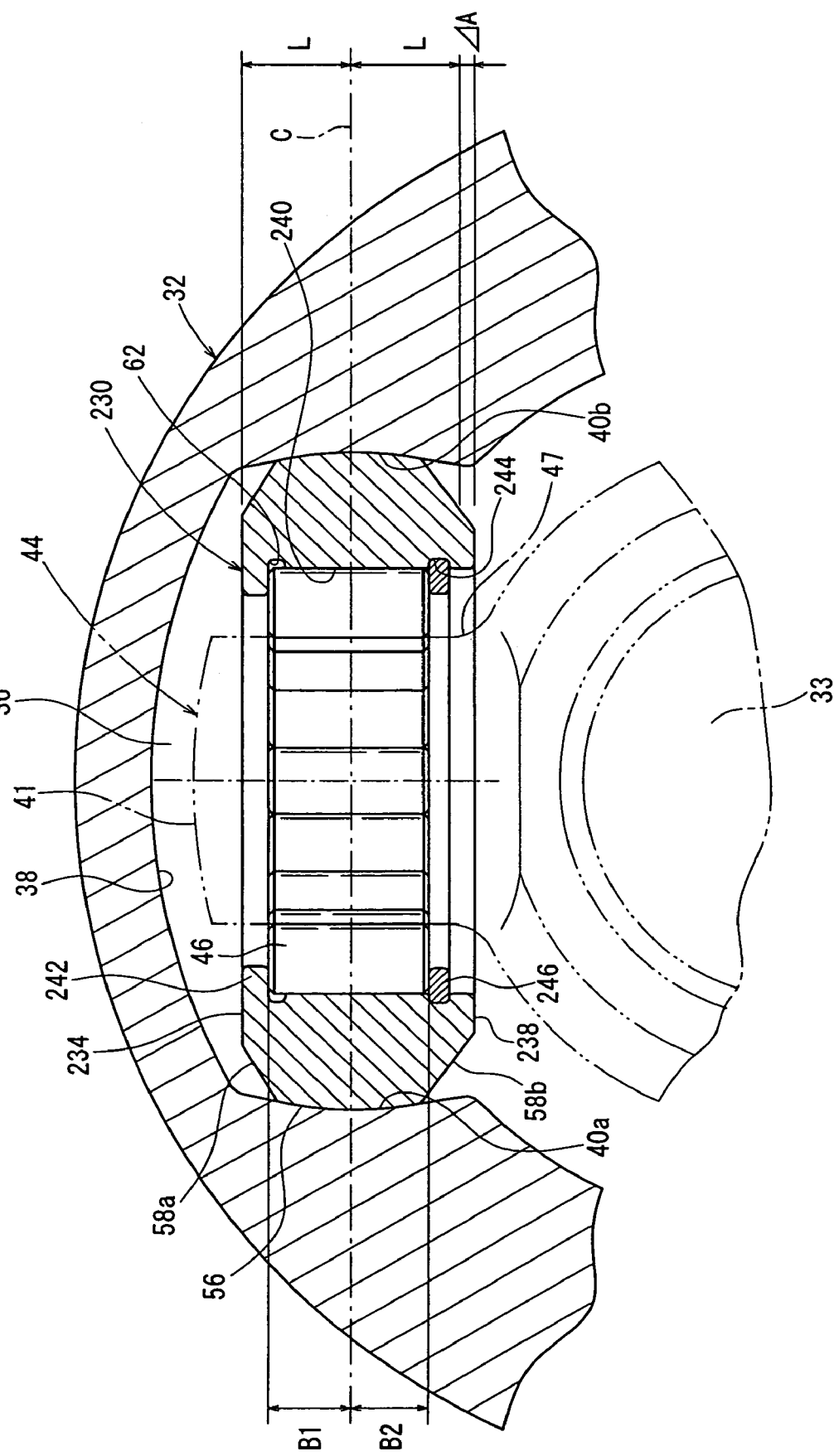
FIG. 17 is an enlarged fragmentary vertical cross-sectional view of a roller of the constant-velocity joint according to the eighth embodiment.

As shown in FIG. 17, the roller 230 has an inside-diameter surface 240 on its inner circumference thereof which has a constant diameter and functions as a rolling surface for the needle bearing rollers 46. The roller 230 has an annular flange 242 integrally formed therewith which projects a predetermined length radially inwardly at a position near the distal end 41 of the trunnion 44 above the inside-diameter surface 240.

A circlip (retaining member) 246 is mounted in an annular groove 244 near the proximal end 47 of the trunnion 44 beneath the inside-diameter surface 240 opposite to the flange 242. The needle bearing rollers 46 mounted on the inside-diameter surface 240 of the roller 230 are vertically held in position by the flange 242 and the circlip 246.

The circlip 246 may be replaced with a washer, not shown, press-fitted in an annular recess in the roller 230. The retaining member is not limited to the circlip or the washer, but may be a clip, a press-fitted member, a spring lock washer, a spring washer, a washer, a snap ring, a retaining ring, a spring washer, a grip snap ring, a ring, or the like.

With the tripod constant-velocity joint 210, the trunnion 44 and the roller 230 slide relatively against each other in the axial directions of the trunnion 44. Therefore, it is necessary to provide retaining members such as the circlip 246, etc. on the both ends of the inside-diameter surface 240 of the roller 230 for limiting the axial displacement of the needle bearing rollers 46.

The relative sliding movement refers to sliding movement of the trunnion 44 in its axial directions with respect to the roller 230 or sliding movement of the roller 230 in its axial directions with respect to the trunnion 44.

The needle bearing rollers 46 are juxtaposed substantially parallel to each other circumferentially on the inside-diameter surface 240 of the roller 230. The needle bearing rollers 46 are retained against separation or dislodgment from the inside-diameter surface 240 by the flange 242 and the circlip 246 which are disposed on both ends of the inside-diameter surface 240. It is assumed that the needle bewaring rollers 46 disposed along the inside-diameter surface 240 of the roller 230 have substantially the same diameter and substantially the same shape. The trunnion 44 has a cylindrical portion 45 having a constant outside diameter.

As shown in FIG. 17, if a central line C is drawn diametrically across the roller 230 dividing the arcuate face 56 contacting the guide groove 36 of the outer member 32 into two equal upper and lower sections, then the length (thickness) from the central line C to an upper first surface 234 is represented by L, the length (thickness) from the central line C to a lower second surface 238 by (L+$\Delta$A), and the overall axial thickness of the roller 230 by (2L+$\Delta$A).

Specifically, the side of the roller 230 where the circlip 246 for preventing the needle bearing rollers 46 from being dislodged is provided is thicker than the side of the roller 230 where the flange 242 is provided, by the axial dimension $\Delta$A for supporting the circlip 246. Therefore, the flange 242 side and the circlip 246 side have different thicknesses along the axial directions on both sides of the central line C extending diametrically across the roller 230.

The central line C extending diametrically across the roller 230 divides the total axial length of the needle bearing rollers 46 into two equal dimensions (B=B2). The center of the needle bearing rollers 46 which divides the axial length into two equal dimensions and the central line C of the roller 230 are in agreement with each other.

According to the eighth embodiment, the thicker portion of the roller 230 wherein the circlip 246 is mounted on one side of the central line C extending diametrically across the roller 230 is disposed closely to the proximal end 47 of the trunnion 44, and the roller 230 is placed in position for sliding movement along the guide groove 36 of the outer member 32.

According to the eighth embodiment, therefore, even if the circlip 246 is dislodged from the annular groove 244 for some reasons, since the circlip 246 is mounted on the proximal end 47 of the trunnion 44, rather than on the distal end 41 thereof, the needle bearing rollers 46 placed on the inside-diameter surface 240 of the roller 230 are retained by the flange 242 of the roller 230 under centrifugal forces generated by the rotation of the constant-velocity joint 210, and hence are prevented from being ejected from the inside-diameter surface 240 of the roller 230. Therefore, the constant-velocity joint 210 has its rotational drive power transmitting function prevented from being impaired.

Figure 18:
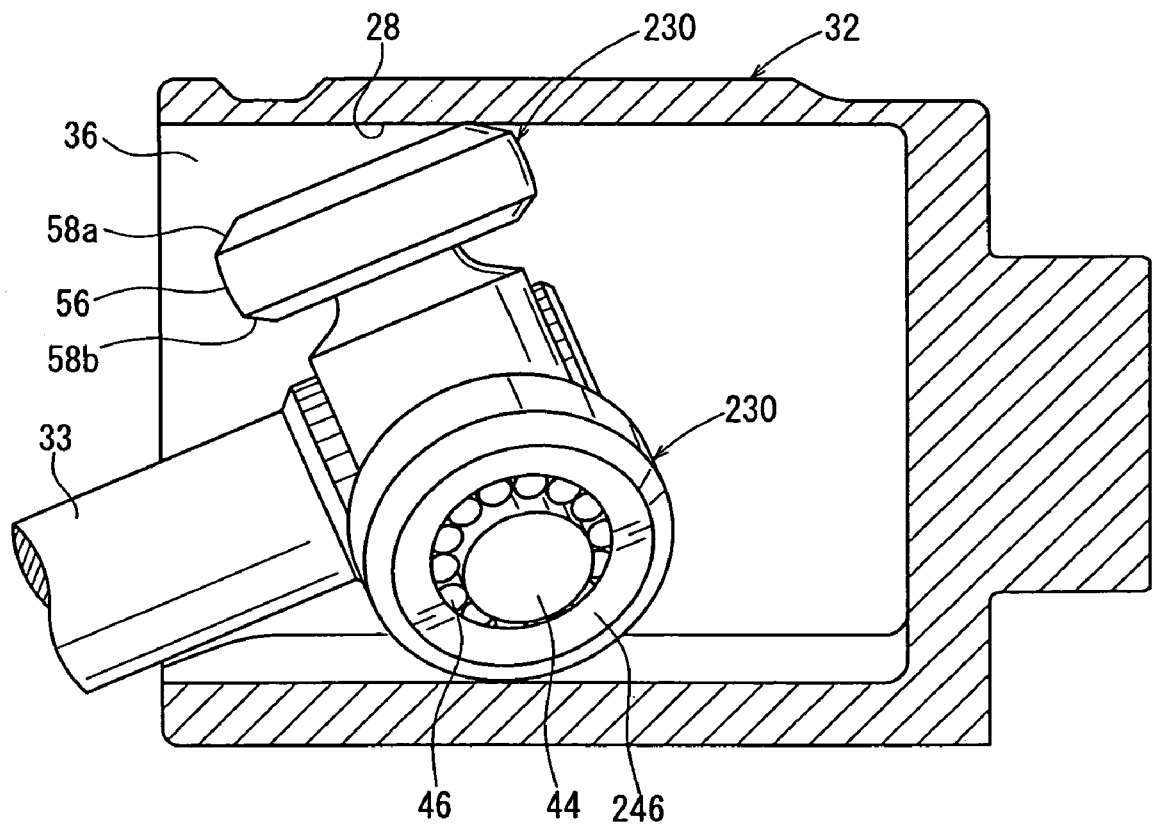
FIG. 18 is a perspective view, partly in cross section, of a constant-velocity joint according to a first comparative example.

As shown in FIG. 18, according to a first comparative example, the roller 230 is assembled such that the flange 242 and the circlip 246 are disposed upside down unlike the above embodiment such that the circlip 246 is positioned near the distal end 41 of the trunnion 44 and the flange 242 is positioned near the proximal end 47 of the trunnion 44. With the arrangement of the first comparative example, the roller 230 and the ceiling 38 of the guide groove 36 contact each other, reducing the operating angle that is formed as angle at which the non-illustrated transmission shaft (axis) and the other transmission shaft (axis) 33 cross each other.

According to the eighth embodiment, however, the flange 242 side on one side of the central line C extending diametrically across the roller 230 is thinner to provide a sufficient distance by which the upper first surface 234 of the roller 230 and the ceiling 38 of the guide groove 36 are spaced from each other. Therefore, the operating angle of the eighth embodiment is greater than the operating angle of the first comparative example.

Figure 19:
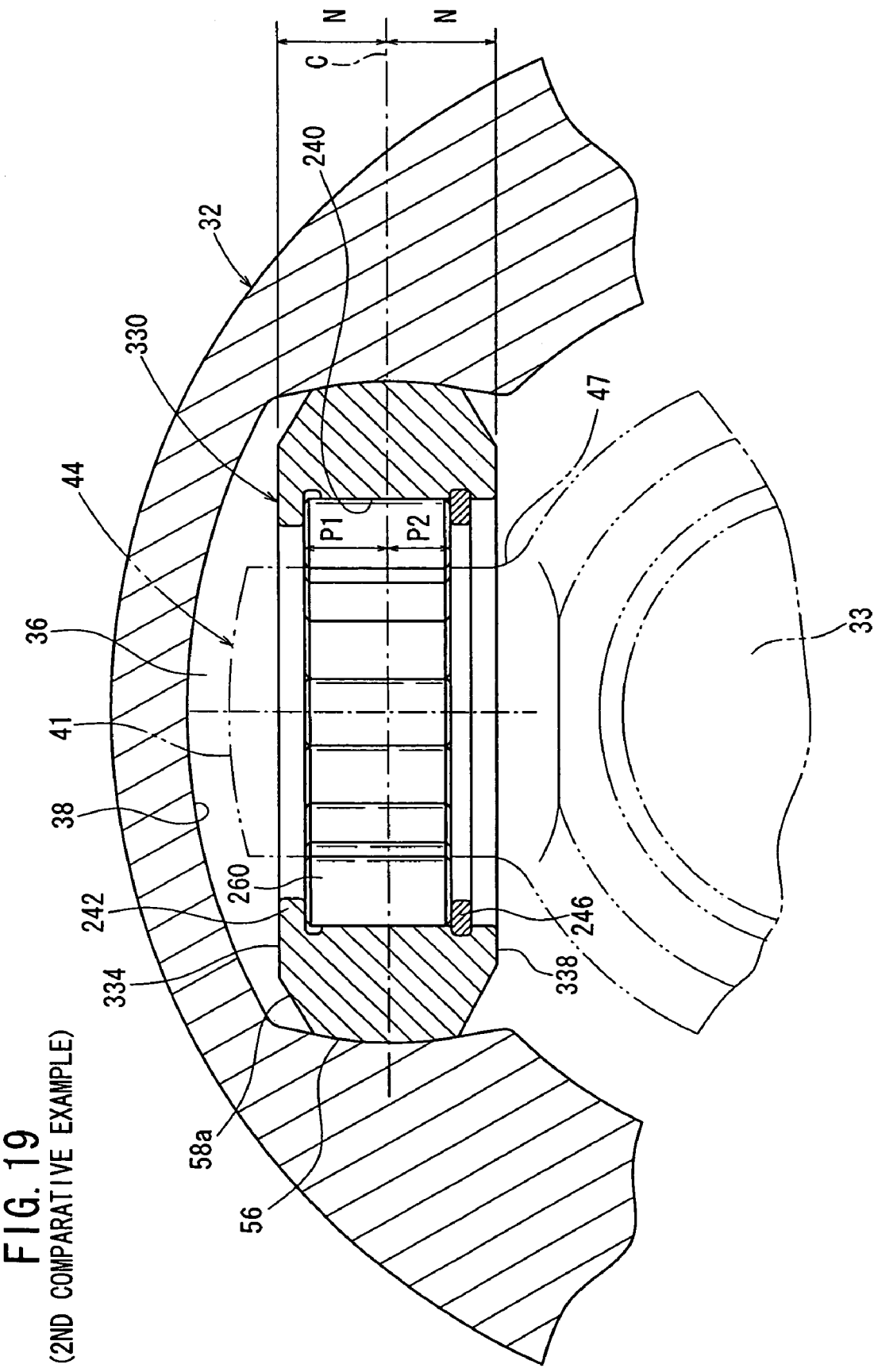
FIG. 19 is an enlarged fragmentary vertical cross-sectional view of a roller of a constant-velocity joint according to a second comparative example.

As shown in FIG. 19, according to a second comparative example, the axial length N from a central line C extending diametrically across a roller 330 to an upper first surface 334 of the roller 330 and the axial length N from the central line C to a lower second surface 338 of the roller 330 are identical to each other, and the length from the central line C to an axial end of needle bearing rollers 260 and the length from the central line C to the other axial end of the needle bearing rollers 260 are different from each other (P1$\neq$P2). The central line C of the roller 330 which divides the arcuate face 56 into two equal sections and the center of the needle bearing rollers 260 which divides the axial length thereof into two equal dimensions are not in agreement with each other. When a load torque is transmitted from the outer member 32 through the roller 330 and the needle bearing rollers 260 to the trunnion 44, because the axial length of the needle bearing rollers 260 is not equally distributed on both sides of the central line C of the roller 330, unequal loads are applied to the trunnion 44 and the needle bearing rollers 260, possibly adversely affecting the durability of the trunnion 44.

According to the second comparative example, furthermore, if the axial length of the needle bearing rollers 260 is shortened to bring the center of the needle bearing rollers 260 which divides the axial length thereof into two equal dimensions into agreement with the central line C of the roller 330, then since the length along which the needle bearing rollers 260 contact the outer circumferential surface of the trunnion 44 is reduced, the pressure on the contacting surfaces increases. As a result, an excessive load is imposed on the proximal end 47 of the trunnion 44, tending to reduce the durability of the trunnion 44.

According to the eighth embodiment, however, although the flange 242 side and the circlip 246 side of the central line C extending diametrically across the roller 230 are of vertically asymmetrical shapes with different thicknesses, the central line C of the roller 230 and the center of the needle bearing rollers 46 which divides the axial length thereof into two equal dimensions (B1=B2) are in agreement with each other, so that the needle bearing rollers 46 have a sufficient axial length for contact with the outer circumferential surface of the trunnion 44, preventing the durability of the trunnion 44 from being reduced.

The invention claimed is:

1. A constant-velocity joint having a tubular outer member having a plurality of axially extending guide grooves defined in an inner circumferential surface thereof and spaced at predetermined intervals, said outer member being connected to one transmission shaft, and an inner member inserted in an open internal space of said outer member and connected to another transmission shaft, wherein said inner member comprises:

a plurality of trunnions projecting into said guide grooves;

a ring-shaped roller held in contact with each of said guide grooves and fitted over each of said trunnions; and a plurality of rolling elements rollingly interposed between each of said trunnions and said roller, said roller having a flange disposed on an inner circumferential surface thereof near a projecting end of each of said trunnions, said flange projecting radially inwardly and circularly extending along said inner circumferential surface, wherein an annular member is mounted on said trunnion near a proximal end thereof, said rolling elements being retained between said flange and said annular member, and wherein a ratio (r1/D) of a radius (r1) of curvature of an outer circumferential surface of said trunnion, which extends from a cylindrical portion of the trunnion, onto which said roller is fit, to said proximal end thereof to a diameter (D) of said cylindrical portion is set to a range from 0.05 to 0.35.

2. A constant-velocity joint according to claim 1, wherein said annular member has a beveled surface produced by beveling an area thereof which is held against the proximal end of said trunnion.

3. A constant-velocity joint according to claim 1, wherein a gap (X) is set between said annular member and said rolling elements for providing a predetermined distance ($\delta$) by which said roller is movable in an axial direction of said trunnion.

4. A constant-velocity joint according to claim 1, wherein a gap K between said rolling elements and said annular member or a gap K between said roller and said annular member is set with respect to a distance $\delta$ by which said roller is movable in an axial direction of said trunnion, according to the relationship:

$$K > \delta = R/2 \cdot (1/\cos \theta_{max} - 1)$$

where R: the radius of rotation of the center of said roller around a central axis of said outer member; and $\theta_{max}$: the maximum angle of tilt of said other transmission shaft with respect to said one transmission shaft.

* * * * *